(12) United States Patent
Onoue et al.

(10) Patent No.: US 10,026,554 B2
(45) Date of Patent: *Jul. 17, 2018

(54) MULTILAYER CAPACITOR WITH (1) AN ELEMENT BODY HAVING INTERNAL ELECTRODES AND (2) OPPOSING TERMINAL ELECTRODES

(71) Applicant: TDK CORPORATION, Tokyo (JP)

(72) Inventors: Toru Onoue, Tokyo (JP); Ken Morita, Tokyo (JP); Kenta Yamashita, Tokyo (JP)

(73) Assignee: TDK CORPORATION, Tokyo (JP)

( * ) Notice: Subject to any disclaimer, the term of this patent is extended or adjusted under 35 U.S.C. 154(b) by 200 days.

This patent is subject to a terminal disclaimer.

(21) Appl. No.: 14/995,604

(22) Filed: Jan. 14, 2016

(65) Prior Publication Data

US 2016/0240315 A1    Aug. 18, 2016

(30) Foreign Application Priority Data

Feb. 13, 2015 (JP) .................................. 2015-026263

(51) Int. Cl.

| H01G 4/232 | (2006.01) |
| H01G 4/30 | (2006.01) |
| H01G 4/12 | (2006.01) |
| H01G 4/224 | (2006.01) |
| H01G 4/236 | (2006.01) |

(52) U.S. Cl.
CPC ............. *H01G 4/2325* (2013.01); *H01G 4/12* (2013.01); *H01G 4/224* (2013.01); *H01G 4/236* (2013.01); *H01G 4/30* (2013.01)

(58) Field of Classification Search
CPC ........ H01G 4/2325; H01G 4/236; H01G 4/12; H01G 4/30; H01G 4/248
See application file for complete search history.

(56) References Cited

U.S. PATENT DOCUMENTS 6,388,864 B1 * 5/2002 Nakagawa ............... H01G 2/14
361/306.3
2003/0169556 A1     9/2003 Yokoyama et al.
(Continued)

FOREIGN PATENT DOCUMENTS

| CN | 1444239 A | 9/2003 |
| CN | 104064353 A | 9/2014 |

(Continued)

*Primary Examiner* — David M Sinclair
(74) *Attorney, Agent, or Firm* — Oliff PLC

(57) ABSTRACT

A length in a first direction of the element body is smaller than a length in a second direction of the element body and smaller than a length in a third direction of the element body, the second direction being perpendicular to the first direction, the third direction being perpendicular to the first and second direction. Each of a first terminal electrode and a second terminal electrode includes a sintered conductor layer formed on the element body, a first plated layer formed on the sintered conductor layer, and a second plated layer formed on the first plated layer. In each of a first electrode portion disposed on a principal face and a third electrode portion disposed on a principal face, a maximum thickness of the sintered conductor layer is larger than a thickness of the first plated layer and not more than a thickness of the second plated layer.

10 Claims, 16 Drawing Sheets

(56) References Cited

U.S. PATENT DOCUMENTS

| | | | |
|---|---|---|---|
| 2004/0208987 A1 | 10/2004 | Yokoyama et al. | |
| 2007/0000439 A1 | 1/2007 | Yokoyama et al. | |
| 2010/0128411 A1 | 5/2010 | Onishi et al. | |
| 2014/0116761 A1 | 5/2014 | Lee et al. | |
| 2014/0185189 A1* | 7/2014 | Kim | H01G 4/30 361/321.2 |
| 2014/0285947 A1* | 9/2014 | Suga | H01G 4/30 361/301.4 |
| 2014/0367152 A1* | 12/2014 | Lee | H05K 1/111 174/260 |
| 2014/0368968 A1* | 12/2014 | Lee | H01G 4/005 361/301.4 |
| 2015/0041196 A1* | 2/2015 | Kim | H01G 4/30 174/260 |
| 2015/0049412 A1* | 2/2015 | Kim | H01G 4/30 361/301.4 |
| 2015/0090485 A1* | 4/2015 | Lee | H01G 2/065 174/260 |
| 2015/0380161 A1* | 12/2015 | Lim | H01G 4/30 361/301.4 |
| 2016/0240316 A1* | 8/2016 | Onoue | H01G 4/2325 |

FOREIGN PATENT DOCUMENTS

| | | | | |
|---|---|---|---|---|
| CN | 104240950 A | | 12/2014 | |
| CN | 105895372 A | | 8/2016 | |
| JP | 2005123407 A | * | 5/2005 | ............ H01G 4/232 |
| JP | 2010-129737 A | | 6/2010 | |
| KR | 10-2014-0038912 | | 3/2014 | |
| TW | 201426784 A | | 7/2014 | |

* cited by examiner

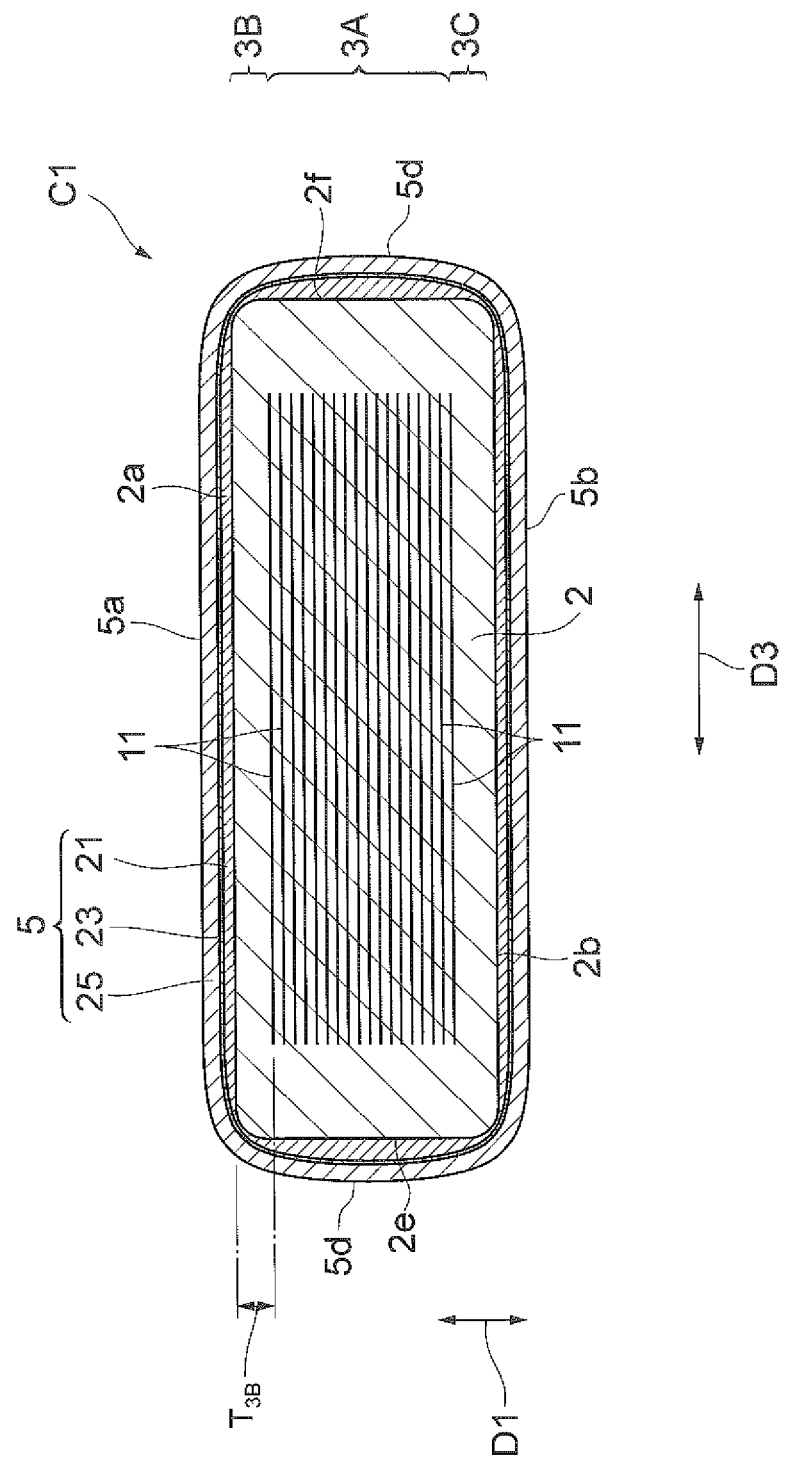

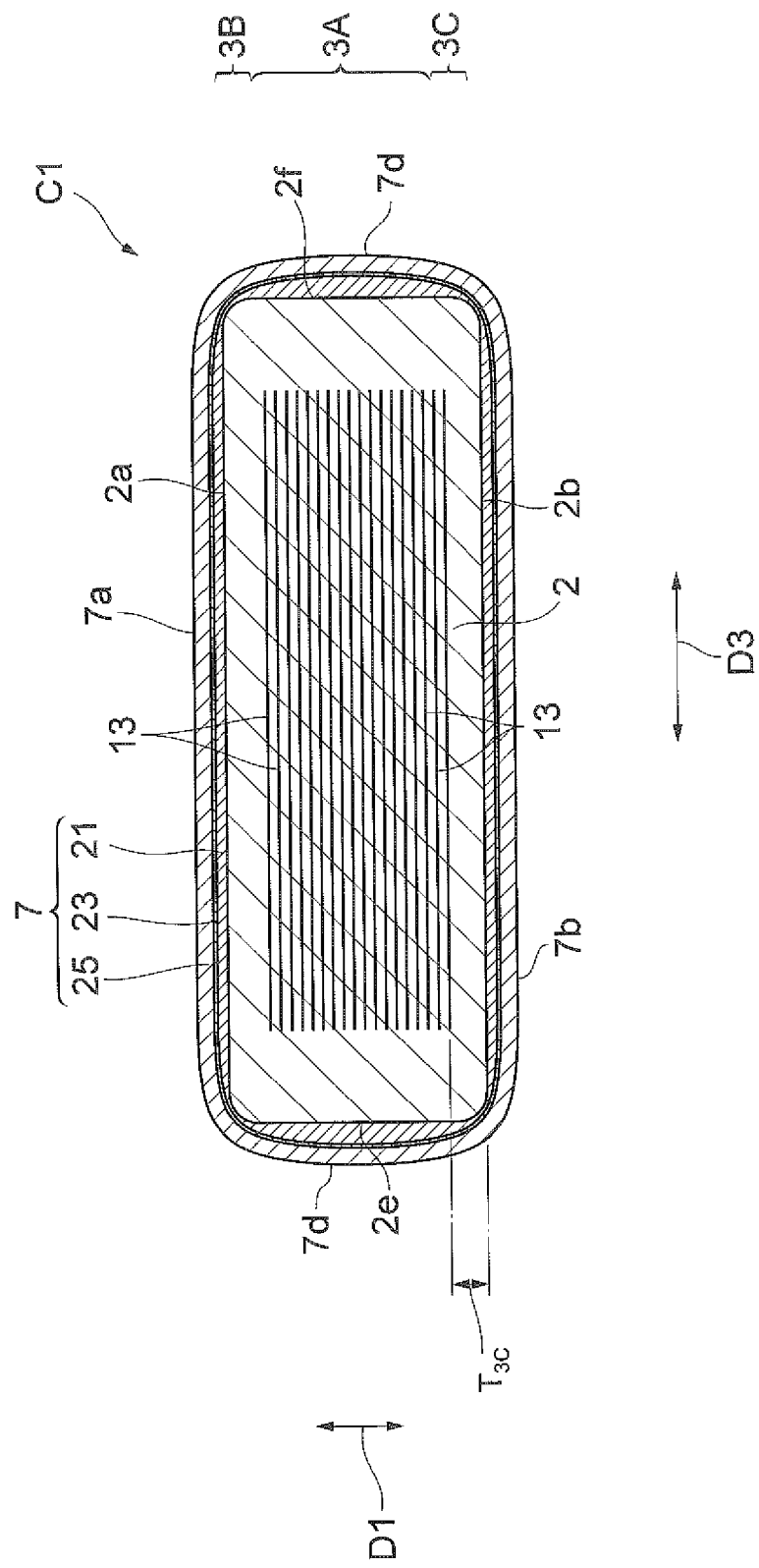

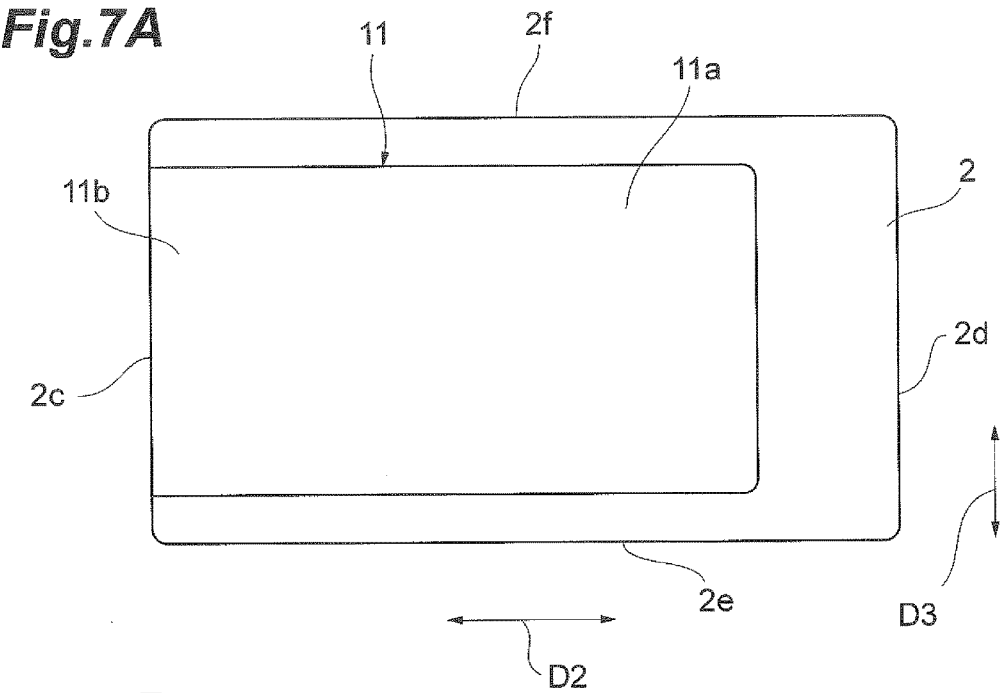
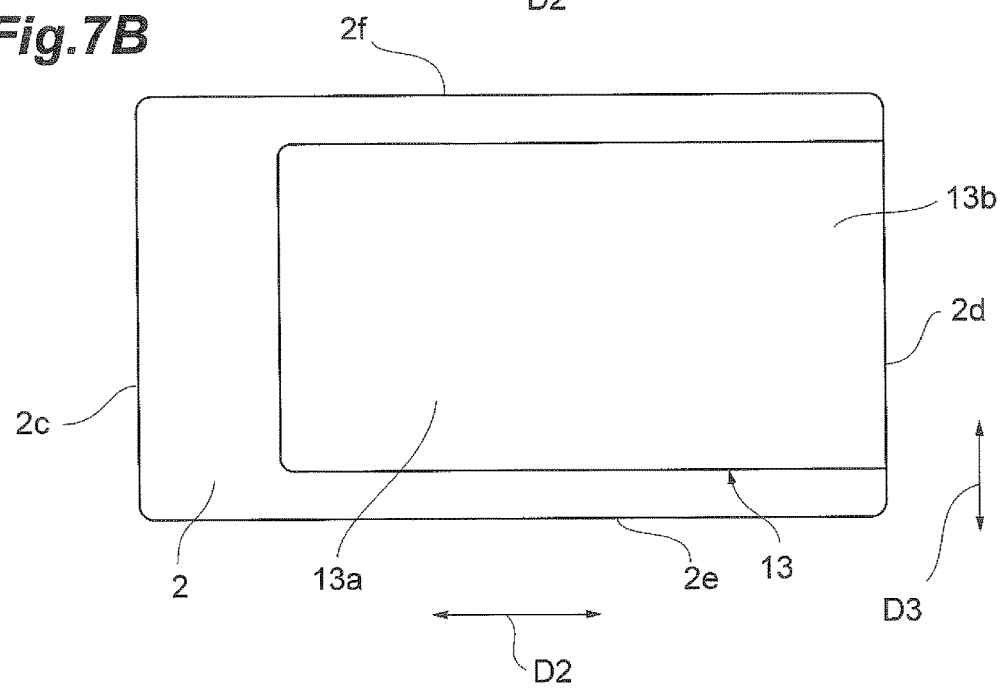

MULTILAYER CAPACITOR WITH (1) AN ELEMENT BODY HAVING INTERNAL ELECTRODES AND (2) OPPOSING TERMINAL ELECTRODES

TECHNICAL FIELD

The present invention relates to a multilayer capacitor.

BACKGROUND

Known multilayer capacitor described in Japanese Unexamined Patent Publication No. 2010-129737 are multilayer capacitors that are built into substrates with built-in electronic components. The multilayer capacitor includes an element body of a rectangular parallelepiped shape, a plurality of first internal electrodes, a plurality of second internal electrodes, a first terminal electrode, and a second terminal electrode. The plurality of first and second internal electrodes are alternately disposed in the element body to oppose each other. The first terminal electrode is disposed on the element body and is connected to the plurality of first internal electrodes. The second terminal electrode is disposed on the element body and is connected to the plurality of second internal electrodes.

SUMMARY

In a process of manufacturing the substrate with built-in electronic component, the multilayer capacitor is built into the substrate and thereafter via holes are formed in the substrate to reach the first terminal electrode and the second terminal electrode. The via holes are formed by laser processing. In this case, the first terminal electrode and the second terminal electrode are irradiated with a laser beam, and may be damaged by the laser beam.

One aspect of the present invention provides a multilayer capacitor which is feasible to suppress the effect of damage due to the irradiation with the laser beam and achieves reduction in height.

A multilayer capacitor according to one aspect of the present invention includes an element body of a rectangular parallelepiped shape, a plurality of first internal electrodes, a plurality of second internal electrodes, a first terminal electrode, and a second terminal electrode. The element body includes a pair of principal surfaces opposing each other in a first direction, a pair of first side surfaces opposing each other in a second direction perpendicular to the first direction, and a pair of second side surfaces opposing each other in a third direction perpendicular to the first and second directions. The plurality of first internal electrodes and the plurality of second internal electrodes are alternately disposed in the element body to oppose each other in the first direction. The first terminal electrode includes a first electrode portion disposed on the principal surface and a second electrode portion disposed on one of the first side surfaces. The second electrode portion is connected to the plurality of first internal electrodes. The second terminal electrode includes a third electrode portion disposed on the principal surface and a fourth electrode portion disposed on the other of the first side surfaces. The third electrode portion is separated from the first electrode portion in the second direction on the principal surface. The fourth electrode portion is connected to the plurality of second internal electrodes. The element body includes an inner layer portion and a pair of outer layer portions. The inner layer portion is located between the pair of outer layer portions in the first direction. The plurality of first internal electrodes and the plurality of second internal electrodes are located in the inner layer portion. A length in the first direction of the element body is smaller than a length in the second direction of the element body and smaller than a length in the third direction of the element body. Each of the first terminal electrode and the second terminal electrode includes a sintered conductor layer formed on the element body, a first plated layer formed on the sintered conductor layer, and a second plated layer formed on the first plated layer. In each of the first electrode portion and the third electrode portion, a maximum thickness of the sintered conductor layer is larger than a thickness of the first plated layer and not more than a thickness of the second plated layer.

In the multilayer capacitor according to the one aspect, the length in the first direction of the element body is smaller than the length in the second direction of the element body and smaller than the length in the third direction of the element body. For this reason, the multilayer capacitor is obtained that has reduced height and the multilayer capacitor is realized that is suitable for built-in mounting in a substrate. The first terminal electrode includes the first electrode portion disposed on the principal surface of the element body and the second terminal electrode includes the third electrode portion disposed on the principal surface of the element body. The multilayer capacitor according to the one aspect can be electrically connected to wiring formed on the substrate, on the foregoing principal surface side of the element body. Therefore, the multilayer capacitor according to the one aspect can be readily built into the substrate.

In each of the first electrode portion and the third electrode portion, the maximum thickness of the sintered conductor layer is larger than the thickness of the first plated layer. For this reason, the first plated layer is thin in the multilayer capacitor according to the one aspect, compared to a multilayer capacitor in which in each of the first electrode portion and the third electrode portion, the thickness of the first plated layer is not less than the maximum thickness of the sintered conductor layer. In the multilayer capacitor according to the one aspect, therefore, it is feasible to reduce stress occurring in a process of forming the first plated layer on the sintered conductor layer. In the multilayer capacitor according to the one aspect, the second plated layer is thick, compared to a multilayer capacitor in which in each of the first electrode portion and the third electrode portion, the thickness of the second plated layer is smaller than the maximum thickness of the sintered conductor layer. Therefore, it is feasible to suppress the effect of damage due to the irradiation with the laser beam even in the case where the first and third electrode portions are irradiated with the laser beam.

The sintered conductor layer may contain Cu or Ni. In this case, the first internal electrodes and the first terminal electrode are securely kept in contact with each other due to the first internal electrodes being connected to the sintered conductor layer of the first terminal electrode. The second internal electrodes and the second terminal electrode are securely kept in contact with each other due to the second internal electrodes being connected to the sintered conductor layer of the second terminal electrode.

The first plated layer may contain Ni or Sn. In this case, the first plated layer restrains the sintered conductor layer from being damaged in a process of forming the second plated layer. For this reason, in the multilayer capacitor of this embodiment, it is feasible to suppress degradation of insulation resistance of the multilayer capacitor.

The second plated layer may contain Cu or Au. In this case, it is feasible to ensure connectivity between the wiring formed on the substrate and the first and second terminal electrodes.

A difference between a maximum thickness and a minimum thickness of the first electrode portion may be smaller than a difference between a maximum thickness and a minimum thickness of the second electrode portion, and a difference between a maximum thickness and a minimum thickness of the third electrode portion may be smaller than a difference between a maximum thickness and a minimum thickness of the fourth electrode portion. In this case, the first electrode portion has a higher degree of flatness than the second electrode portion does. The third electrode portion has a higher degree of flatness than the fourth electrode portion does. These configurations improve connection reliability between the wiring formed on the substrate and the first and second terminal electrodes.

Thicknesses of the respective outer layer portions may be smaller than the maximum thickness of the first electrode portion and smaller than the maximum thickness of the third electrode portion. In this case, it is feasible to further suppress the effect of damage due to the irradiation with the laser beam and achieve further reduction in height of the multilayer capacitor.

The length in the first direction of the element body may be smaller than a length in the second direction of the first electrode portion and smaller than a length in the second direction of the third electrode portion. In this case, it is feasible to achieve further reduction in height of the multilayer capacitor. In the multilayer capacitor of this embodiment, the areas of the first and third electrode portions are larger and thus electrode areas to be connected to the wiring formed on the substrate are large, compared to a multilayer capacitor in which the length in the second direction of the first electrode portion and the length in the second direction of the third electrode portion are smaller than the length in the first direction of the element body. For this reason, it is easy to implement connection between the wiring formed on the substrate and the first and second terminal electrodes.

The length in the first direction of the element body may be smaller than a gap between the first electrode portion and the third electrode portion in the second direction. In this case, it is also feasible to achieve further reduction in height of the multilayer capacitor.

A gap between the first electrode portion and the third electrode portion in the second direction may be not more than a length in the second direction of the first electrode portion and not more than a length in the second direction of the third electrode portion. In the multilayer capacitor of this embodiment, the areas of the first and third electrode portions are larger and thus electrode areas to be connected to the wiring formed on the substrate are large, compared to a multilayer capacitor in which the gap between the first electrode portion and the third electrode portion in the second direction is larger than the length in the second direction of the first electrode portion and larger than the length in the second direction of the third electrode portion. For this reason, it is easy to implement connection between the wiring forming on the substrate and the first and second terminal electrodes.

The thicknesses of the respective outer layer portions may be smaller than the thickness of the second plated layer. In this case, it is feasible to further suppress the effect of damage due to the irradiation with the laser beam and achieve further reduction in height of the multilayer capacitor.

The second plated layer may be a Cu-plated layer, and projections being made of Cu may be formed on a surface of the Cu-plated layer. The multilayer capacitor is placed in a housing portion of a substrate and thereafter the housing portion is filled with a resin, whereby the multilayer capacitor is built into the substrate. When the projections are formed on the second plated layer, the projections form unevenness on the surface of the second plated layer. The configuration whereby the projections are formed on the second plated layer provides the second plated layer with a large surface area and better engagement between the second plated layer and resin due to the unevenness, compared to a configuration without the projections. Therefore, adhesion between the second plated layer and resin can be improved when the multilayer capacitor is built into the substrate.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 5 is a drawing for explaining a cross-sectional configuration along the line V-V in FIG. 2.

FIG. 6 is a drawing for explaining a cross-sectional configuration along the line VI-VI in FIG. 2.

FIG. 7A is a plan view showing a first internal electrode and FIG. 7B a plan view showing a second internal electrode.

DETAILED DESCRIPTION

Embodiments of the present invention will be described below in detail with reference to the accompanying drawings. In the description, the same elements or elements with the same functionality will be denoted by the same reference signs, without redundant description.

Figure 1:
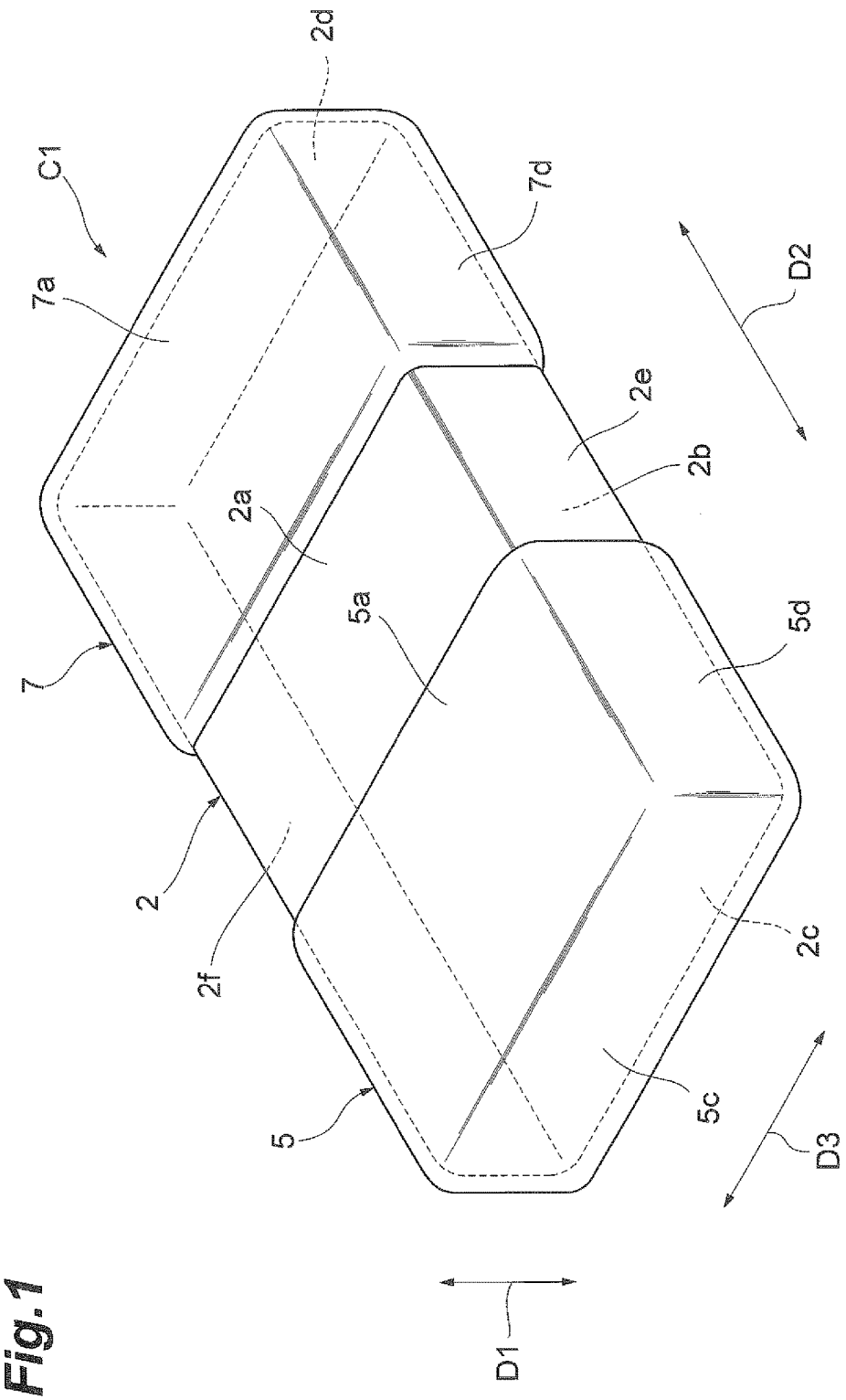
FIG. 1 is a perspective view showing a multilayer capacitor according to an embodiment.
Figure 2:
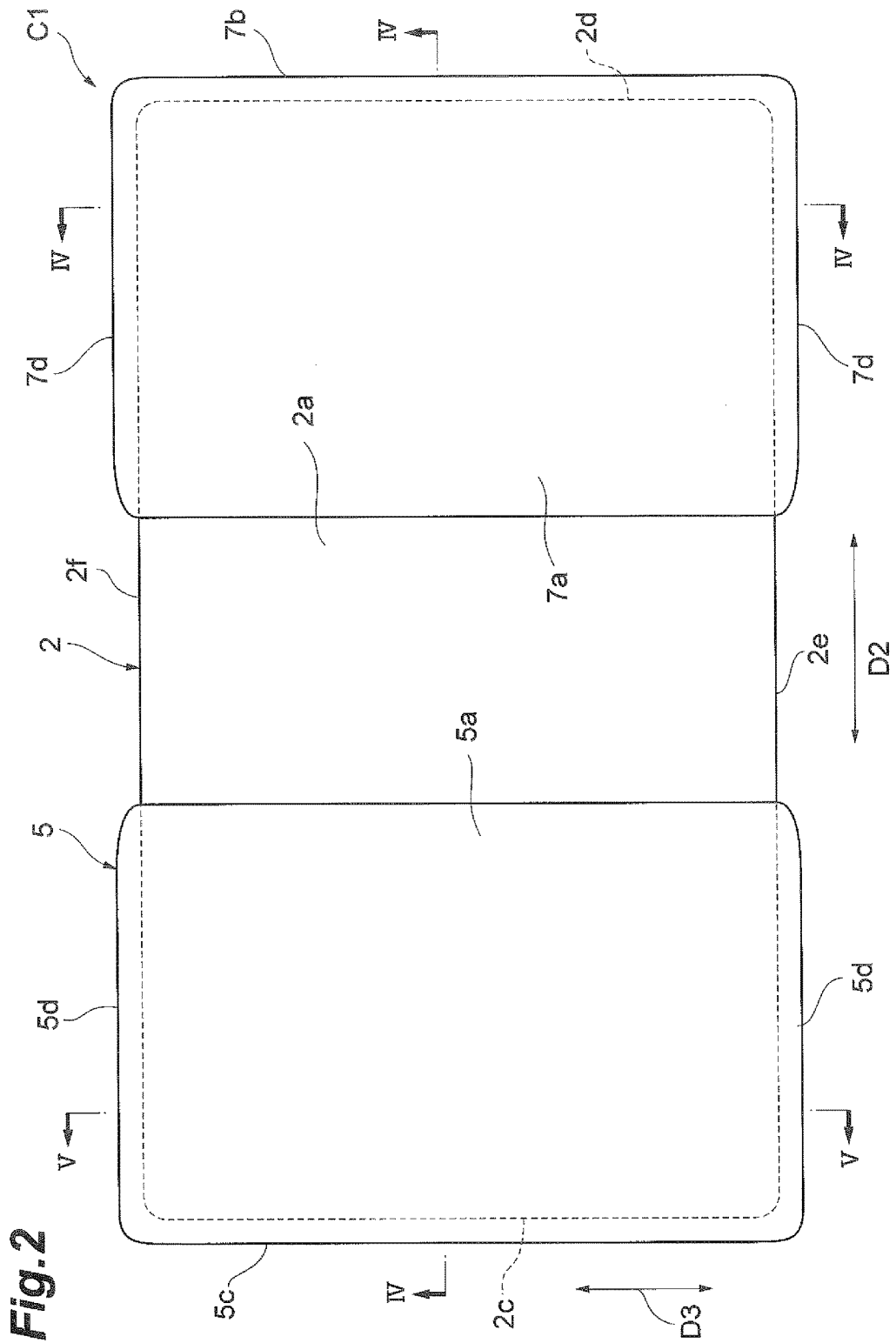
FIG. 2 is a plan view showing the multilayer capacitor according to the embodiment.
Figure 3:
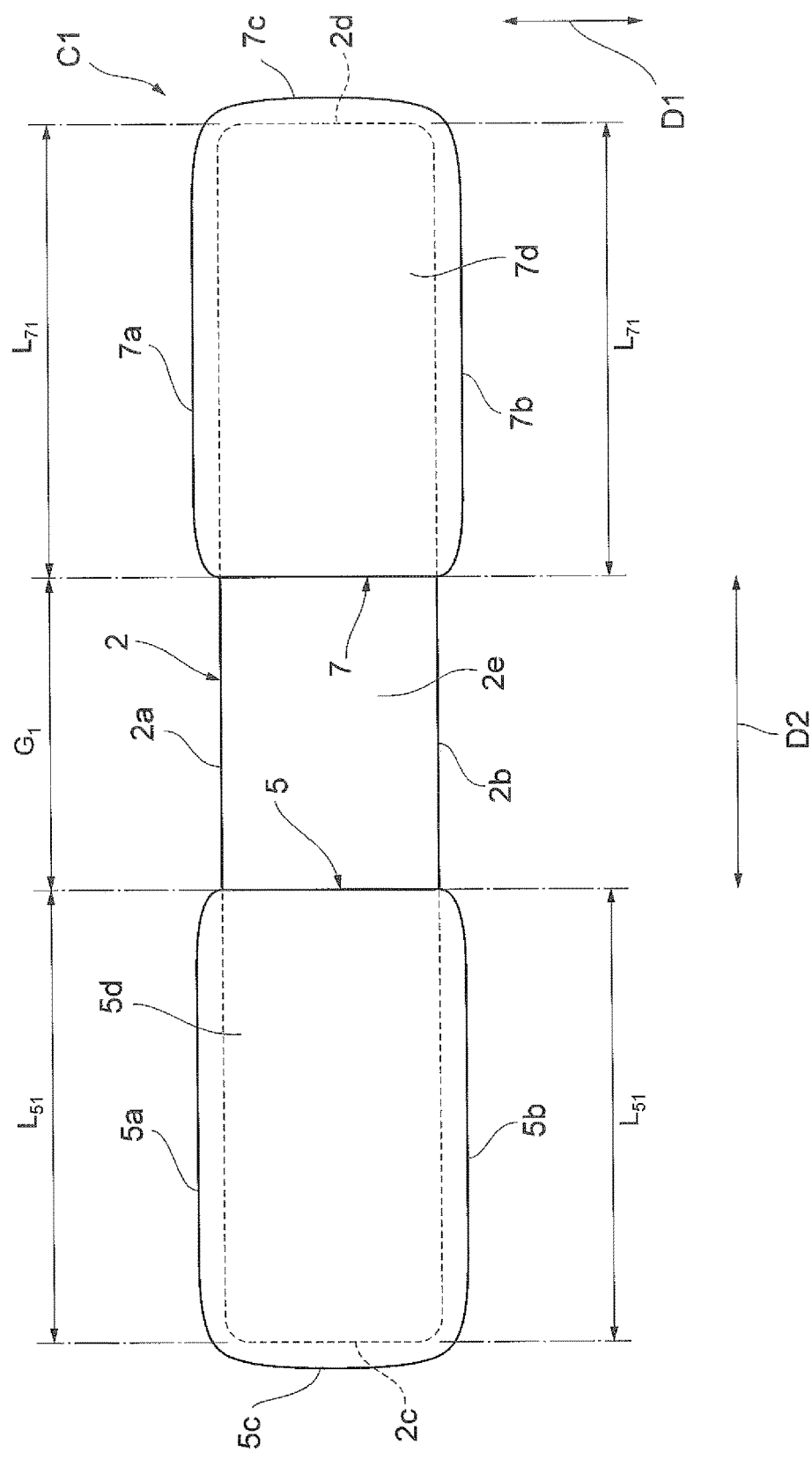
FIG. 3 is a side view showing the multilayer capacitor according to the embodiment.
Figure 4:
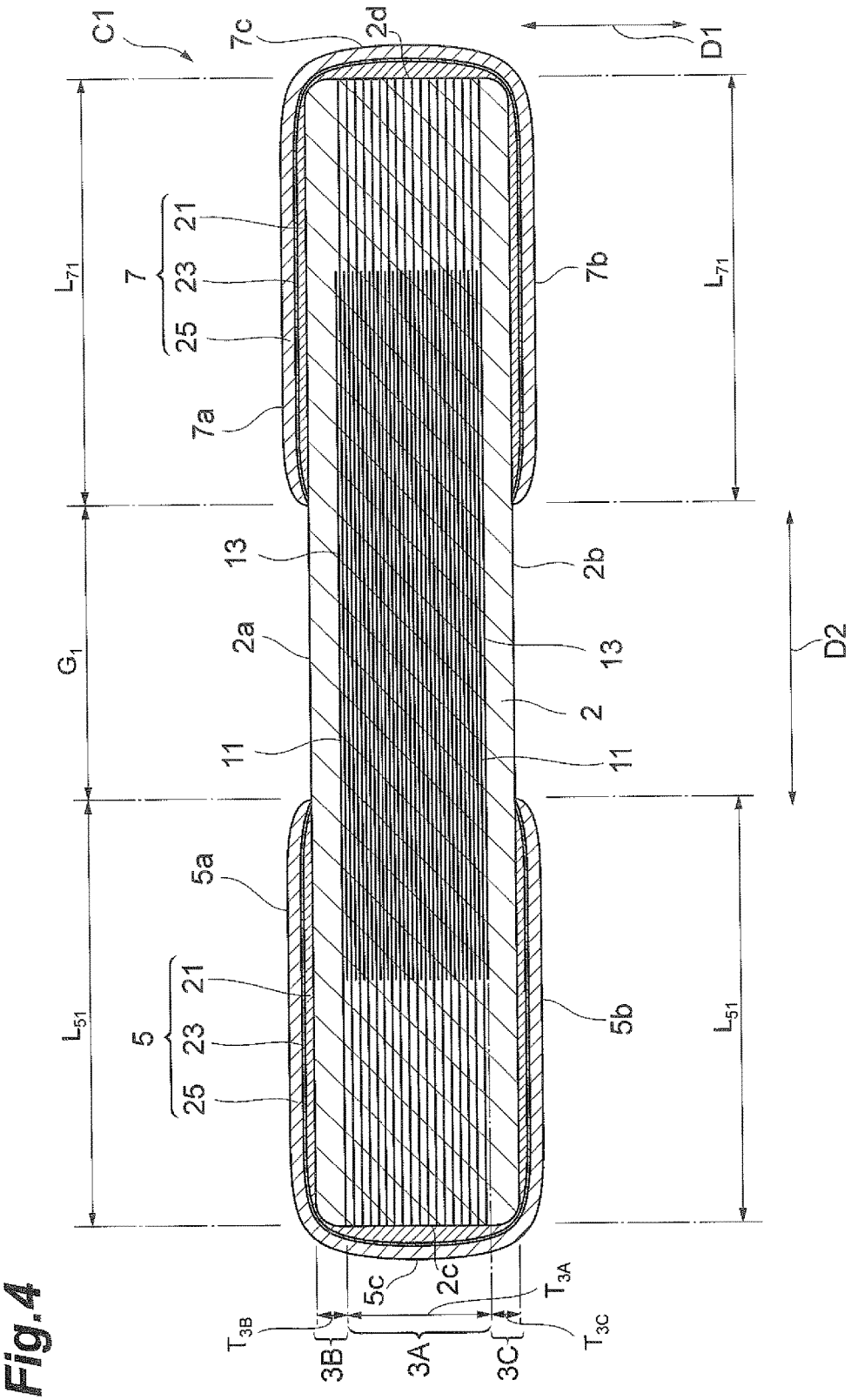
FIG. 4 is a drawing for explaining a cross-sectional configuration along the line IV-IV in FIG. 2.

A configuration of a multilayer capacitor C1 according to the present embodiment will be described with reference to FIGS. 1 to 6. FIG. 1 is a perspective view showing the multilayer capacitor according to the present embodiment. FIG. 2 is a plan view showing the multilayer capacitor according to the present embodiment. FIG. 3 is a side view showing the multilayer capacitor according to the present embodiment. FIG. 4 is a drawing for explaining a cross-sectional configuration along the line IV-IV in FIG. 2. FIG. 5 is a drawing for explaining a cross-sectional configuration along the line V-V in FIG. 2. FIG. 6 is a drawing for explaining a cross-sectional configuration along the line VI-VI in FIG. 2.

The multilayer capacitor C1, as shown in FIGS. 1 to 6, includes an element body 2 of a rectangular parallelepiped shape, and, a first terminal electrode 5 and a second terminal electrode 7 disposed on the exterior surface of the element body 2. The first terminal electrode 5 and second terminal electrode 7 are separated from each other. The rectangular parallelepiped shape embraces a shape of a rectangular parallelepiped with chamfered corners and ridgelines, and a shape of a rectangular parallelepiped with rounded corners and ridgelines.

The element body 2 includes, as the outer surface, a pair of principal surfaces 2a, 2b of a substantially rectangular shape opposing each other, a pair of first side surfaces 2c, 2d opposing each other, and a pair of second side surfaces 2e, 2f opposing each other. A direction in which the pair of principal surfaces 2a, 2b oppose is a first direction D1, a direction in which the pair of first side surfaces 2c, 2d oppose is a second direction D2, and a direction in which the pair of second side surfaces 2e, 2f oppose is a third direction D3. In the present embodiment, the first direction D1 is a height direction of the element body 2. The second direction D2 is a width direction of the element body 2 and is perpendicular to the first direction D1. The third direction D3 is the longitudinal direction of the element body 2 and is perpendicular to the first direction D1 and to the second direction D2.

The length in the first direction D1 of the element body 2 is smaller than the length in the third direction D3 of the element body 2 and smaller than the length in the second direction D2 of the element body 2. The length in the second direction D2 of the element body 2 is larger than the length in the third direction D3 of the element body 2. The length in the third direction D3 of the element body 2 is, for example, from 0.2 to 0.8 mm. The length in the second direction D2 of the element body 2 is, for example, from 0.4 to 1.6 mm. The length in the first direction D1 of the element body 2 is, for example, from 0.1 to 0.35 mm. The multilayer capacitor C1 is an ultra-low-profile multilayer capacitor. The length in the second direction D2 of the element body 2 may be equivalent to the length in the third direction D3 of the element body 2. The length in the third direction D3 of the element body 2 may be larger than the length in the second direction D2 of the element body 2.

It is noted herein that the term "equivalent" does not always mean that values are exactly equal. The values may also be said to be equivalent in cases where the values have a slight difference within a predetermined range or include a manufacturing error or the like. For example, when a plurality of values fall within the range of ±5% of an average of the plurality of values, the plurality of values may be defined as equivalent.

The pair of first side surfaces 2c, 2d extend in the first direction D1 to connect the pair of principal surfaces 2a, 2b. The pair of first side surfaces 2c, 2d also extend in the third direction D3 (the long-side direction of the pair of principal surfaces 2a, 2b). The pair of second side surfaces 2e, 2f extend in the first direction D1 to connect the pair of principal surfaces 2a, 2b. The pair of second side surfaces 2e, 2f also extend in the second direction D2 (the short-side direction of the pair of principal surfaces 2a, 2b).

The element body 2 is constituted of a plurality of dielectric layers stacked in the direction in which the pair of principal surfaces 2a, 2b oppose (the first direction D1). In the element body 2, the direction in which the plurality of dielectric layers are stacked coincides with the first direction D1. For example, each dielectric layer includes a sintered body of a ceramic green sheet containing a dielectric material ($BaTiO_3$-based, $Ba(Ti, Zr)O_3$-based, $(Ba, Ca)TiO_3$-based, or other dielectric ceramic). In the element body 2 in practice, the dielectric layers are so integrated that no boundary can be visually recognized between the dielectric layers.

The multilayer capacitor C1, as shown in FIGS. 4 to 6, includes a plurality of first internal electrodes 11 and a plurality of second internal electrodes 13. The first and second internal electrodes 11, 13 contain an electroconductive material (e.g., Ni or Cu or the like) that is commonly used as internal electrodes of multilayer electric elements. Each of the first and second internal electrodes 11, 13 includes a sintered body of an electroconductive paste containing the foregoing electroconductive material.

The first internal electrodes 11 and the second internal electrodes 13 are disposed at different positions (layers) in the first direction D1. The first internal electrodes 11 and the second internal electrodes 13 are alternately disposed to oppose with a space in between in the first direction D1, in the element body 2. The first internal electrodes 11 and the second internal electrodes 13 have respective polarities different from each other.

Each first internal electrode 11, as shown in FIG. 7A, includes a main electrode portion 11a and a connection portion 11b. The connection portion 11b extends from one side (one short side) of the main electrode portion 11a and is exposed at the first side surface 2c. The first internal electrode 11 is exposed at the first side surface 2c but not exposed at the pair of principal surfaces 2a, 2b, the first side surface 2d, and the pair of second side surfaces 2e, 2f. The main electrode portion 11a and the connection portion 11b are integrally formed.

The main electrode portion 11a is of a rectangular shape with the long sides along the second direction D2 and the short sides along the third direction D3. In the main electrode portion 11a of each first internal electrode 11, the length thereof in the second direction D2 is larger than the length thereof in the third direction D3. The connection portion 11b extends from the end on the first side surface 2c side of the main electrode portion 11a to the first side surface 2c. The length in the second direction D2 of the connection portion 11b is smaller than the length in the second direction D2 of the main electrode portion 11a. The length in the third direction D3 of the connection portion 11b is equivalent to the length in the third direction D3 of the main electrode portion 11a. The connection portion 11b is connected at its end exposed at the first side surface 2c, to the first terminal electrode 5. The length in the third direction D3 of the connection portion 11b may be smaller than the length in the third direction D3 of the main electrode portion 11a.

Each second internal electrode 13, as shown in FIG. 7B, includes a main electrode portion 13a and a connection portion 13b. The main electrode portion 13a opposes the main electrode portion 11a through a part (dielectric layer) of the element body 2 in the first direction D1. The connection portion 13b extends from one side (one short side) of the main electrode portion 13a and is exposed at the first side surface 2d. The second internal electrode 13 is exposed at the first side surface 2d but not exposed at the pair of principal surfaces 2a, 2b, the first side surface 2c, and the pair of second side surfaces 2e, 2f. The main electrode portion 13a and the connection portion 13b are integrally formed.

The main electrode portion 13a is of a rectangular shape with the long sides along the second direction D2 and the short sides along the third direction D3. In the main electrode portion 13a of each second internal electrode 13, the length thereof in the second direction D2 is larger than the length thereof in the third direction D3. The connection portion 13b extends from the end on the first side surface 2d side of the main electrode portion 13a to the first side surface 2d. The length in the second direction D2 of the connection portion 13b is smaller than the length in the second direction D2 of the main electrode portion 13a. The length in the third direction D3 of the connection portion 13b is equivalent to the length in the third direction D3 of the main electrode portion 13a. The connection portion 13b is connected at its end exposed at the first side surface 2d, to the second terminal electrode 7. The length in the third direction D3 of the connection portion 13b may be smaller than the length in the third direction D3 of the main electrode portion 13a.

The element body 2, as shown in FIGS. 4 to 6, includes an inner layer portion 3A and a pair of outer layer portions 3B, 3C. The plurality of first internal electrodes 11 and the plurality of second internal electrodes 13 are located in the inner layer portion 3A. The pair of outer layer portions 3B, 3C are located between the pair of outer layer portions 3B, 3C in the first direction D1. The first internal electrodes 11 and second internal electrodes 13 are not located in the pair of outer layer portions 3B, 3C.

The thickness $T_{3B}$ in the first direction D1 of the outer layer portion 3B is defined by a gap in the first direction D1 between the principal surface 2a and the internal electrode closest to the principal surface 2a (the first internal electrode 11 in the present embodiment). The thickness $T_{3C}$ in the first direction D1 of the outer layer portion 3C is defined by a gap in the first direction D1 between the principal surface 2b and the internal electrode closest to the principal surface 2b (the second internal electrode 13 in the present embodiment). The thickness $T_{3A}$ in the first direction D1 of the inner layer portion 3A is defined by a gap in the first direction D1 between the internal electrode closest to the principal surface 2a and the internal electrode closest to the principal surface 2b. A total value of the thickness $T_{3A}$ of the inner layer portion 3A, the thickness $T_{3B}$ of the outer layer portion 3B, and the thickness $T_{3C}$ of the outer layer portion 3C is equal to the length in the first direction D1 of the element body 2. The thicknesses $T_{3B}$, $T_{3C}$ of the respective outer layer portions 3B, 3C are smaller than the thickness $T_{3A}$ of the inner layer portion 3A.

The first terminal electrode 5 is located at the end on the first side surface 2c side of the element body 2 when viewed along the second direction D2. The first terminal electrode 5 includes an electrode portion 5a disposed on the principal surface 2a, an electrode portion 5b disposed on the principal surface 2b, an electrode portion 5c disposed on the first side surface 2c, and electrode portions 5d disposed on the pair of second side surfaces 2e, 2f. The first terminal electrode 5 is formed on the five surfaces 2a, 2b, 2c, 2e, and 2f. The electrode portions 5a, 5b, 5c, 5d adjacent to each other are connected to each other at the ridgelines of the element body 2 to be electrically connected to each other.

The electrode portion 5a and the electrode portion 5c are connected at the ridgeline between the principal surface 2a and the first side surface 2c. The electrode portion 5a and the electrode portions 5d are connected at the ridgelines between the principal surface 2a and each of the second side surfaces 2e, 2f. The electrode portion 5b and the electrode portion 5c are connected at the ridgeline between the principal surface 2b and the first side surface 2c. The electrode portion 5b and the electrode portions 5d are connected at the ridgelines between the principal surface 2b and each of the second side surfaces 2e, 2f. The electrode portion 5c and the electrode portions 5d are connected at the ridgelines between the first side surface 2c and each of the second side surfaces 2e, 2f.

The electrode portion 5c is disposed to cover all exposed portions of the respective connection portions 11b on the first side surface 2c, Each connection portion 11b is directly connected to the first terminal electrode 5. The connection portion 11b connects the main electrode portion 11a and the electrode portion 5c. Each first internal electrode 11 is electrically connected to the first terminal electrode 5.

The second terminal electrode 7 is located at the end on the first side surface 2d side of the element body 2 when viewed along the second direction D2. The second terminal electrode 7 includes an electrode portion 7a disposed on the principal surface 2a, an electrode portion 7b disposed on the principal surface 2b, an electrode portion 7c disposed on the first side surface 2d, and electrode portions 7d disposed on the pair of second side surfaces 2e, 2f. The second terminal electrode 7 is formed on the five surfaces 2a, 2b, 2d, 2e, and 2f. The electrode portions 7a, 7b, 7c, 7d adjacent to each other are connected to each other at the ridgelines of the element body 2 to be electrically connected to each other.

The electrode portion 7a and the electrode portion 7c are connected at the ridgeline between the principal surface 2a and the first side surface 2d. The electrode portion 7a and the electrode portions 7d are connected at the ridgelines between the principal surface 2a and each of the second side surfaces 2e, 2f. The electrode portion 7b and the electrode portion 7c are connected at the ridgeline between the principal surface 2b and the first side surface 2d. The electrode portion 7b and the electrode portions 7d are connected at the ridgelines between the principal surface 2b and each of the second side surfaces 2e, 2f. The electrode portion 7c and the electrode portions 7d are connected at the ridgelines between the first side surface 2d and each of the second side surfaces 2e, 2f.

The electrode portion 7c is disposed to cover all exposed portions of the respective connection portions 13b on the first side surface 2d. Each connection portion 13b is directly connected to the second terminal electrode 7. The connection portion 13b connects the main electrode portion 13a and the electrode portion 7c. Each second internal electrode 13 is electrically connected to the second terminal electrode 7.

The first terminal electrode 5 and the second terminal electrode 7 are separated in the second direction D2. The electrode portion 5a and the electrode portion 7a disposed on the principal surface 2a are separated in the second direction D2 on the principal surface 2a. The electrode portion 5b and the electrode portion 7b disposed on the principal surface 2b are separated in the second direction D2 on the principal surface 2b. The electrode portion 5d and the electrode portion 7d disposed on the second side surface 2e are separated in the second direction D2 on the second side surface 2e. The electrode portion 5d and the electrode portion 7d disposed on the second side surface 2f are separated in the second direction D2 on the second side surface 2f.

The length $L_{51}$ in the second direction D2 of the electrode portions 5a, 5b and the length $L_{71}$ in the second direction D2 of the electrode portions 7a, 7b are equivalent. A gap $G_1$ in the second direction D2 between the electrode portions 5a, 5b and the electrode portions 7a, 7b is not more than the length $L_{51}$ and not more than the length $L_{71}$. In the present embodiment, the gap $G_1$ is smaller than each of the lengths $L_{51}$, $L_{71}$.

Each of the first and second terminal electrodes 5, 7 includes a first electrode layer 21, a second electrode layer 23, and a third electrode layer 25. Each of the electrode portions 5a, 5b, 5c, 5d and the electrode portions 7a, 7b, 7c, 7d includes the first electrode layer 21, second electrode layer 23, and third electrode layer 25. The third electrode layer 25 constitutes the outermost layer of each of the first and second terminal electrodes 5, 7.

The first electrode layer 21 is formed by applying an electroconductive paste onto the surface of the element body 2 and sintering it. The first electrode layer 21 is a sintered conductor layer (sintered metal layer). In the present embodiment, the first electrode layer 21 is a sintered conductor layer made of Cu. The first electrode layer 21 may be a sintered conductor layer made of Ni. The first electrode layer 21 contains Cu or Ni. For example, the electroconductive paste is obtained by mixing a powder made of Cu or Ni, a glass component, an organic binder, and an organic solvent. The thickness of the first electrode layer 21 is, for example, 20 μm at a maximum and 5 μm at a minimum.

The second electrode layer 23 is formed by plating on the first electrode layer 21. In the present embodiment, the second electrode layer 23 is an Ni-plated layer formed by Ni plating on the first electrode layer 21. The second electrode layer 23 may be an Sn-plated layer. The second electrode layer 23 contains Ni or Sn. The thickness of the second electrode layer 23 is, for example, from 1 to 5 μm.

The third electrode layer 25 is formed by plating on the second electrode layer 23. In the present embodiment, the third electrode layer 25 is a Cu-plated layer formed by Cu plating on the second electrode layer 23. The third electrode layer 25 may be an Au-plated layer. The third electrode layer 25 contains Cu or Au. The thickness of the third electrode layer 25 is, for example, from 1 to 15 μm.

Figure 8:
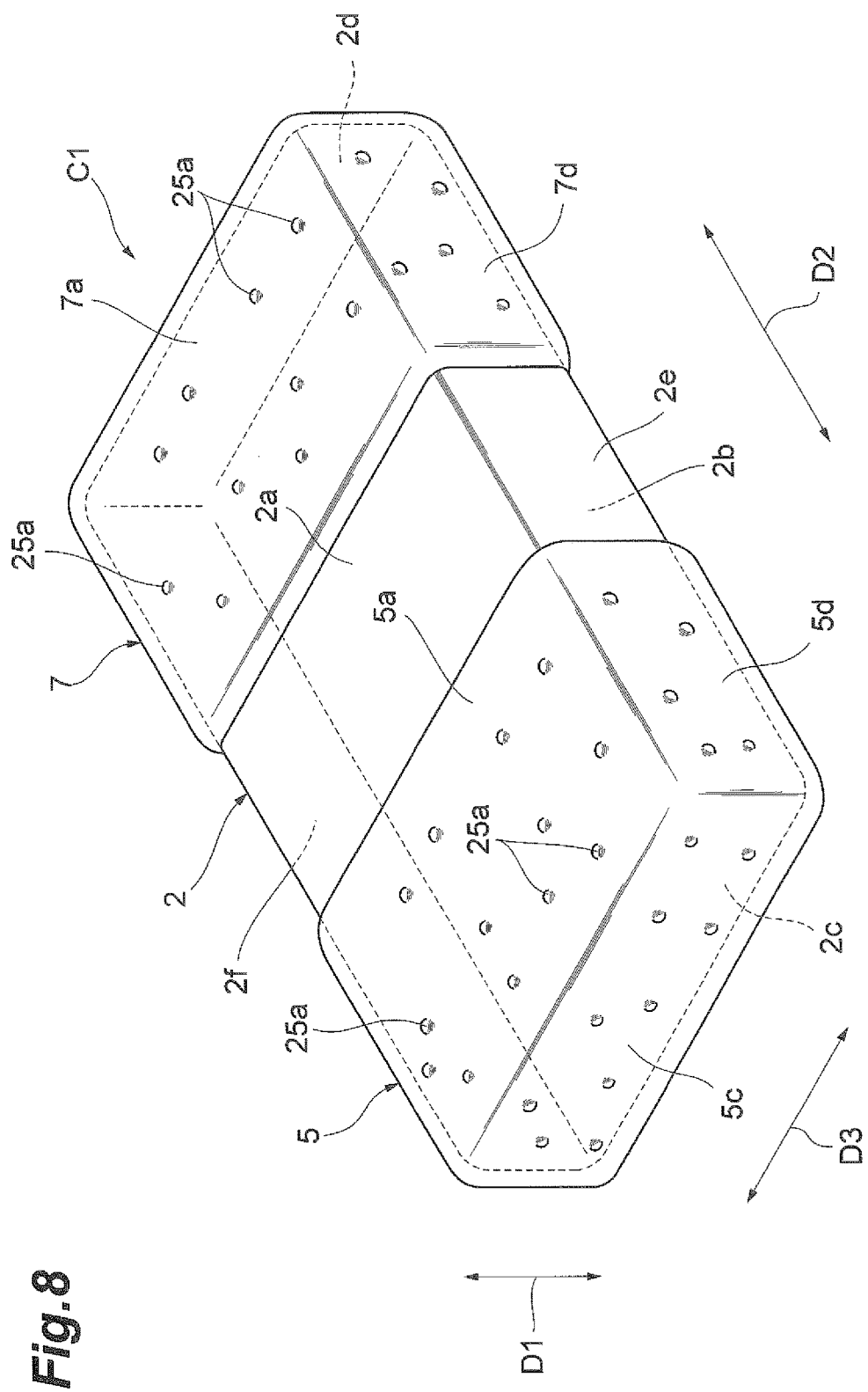
FIG. 8 is a perspective view showing a multilayer capacitor according to a modification example of the embodiment.
Figure 9:
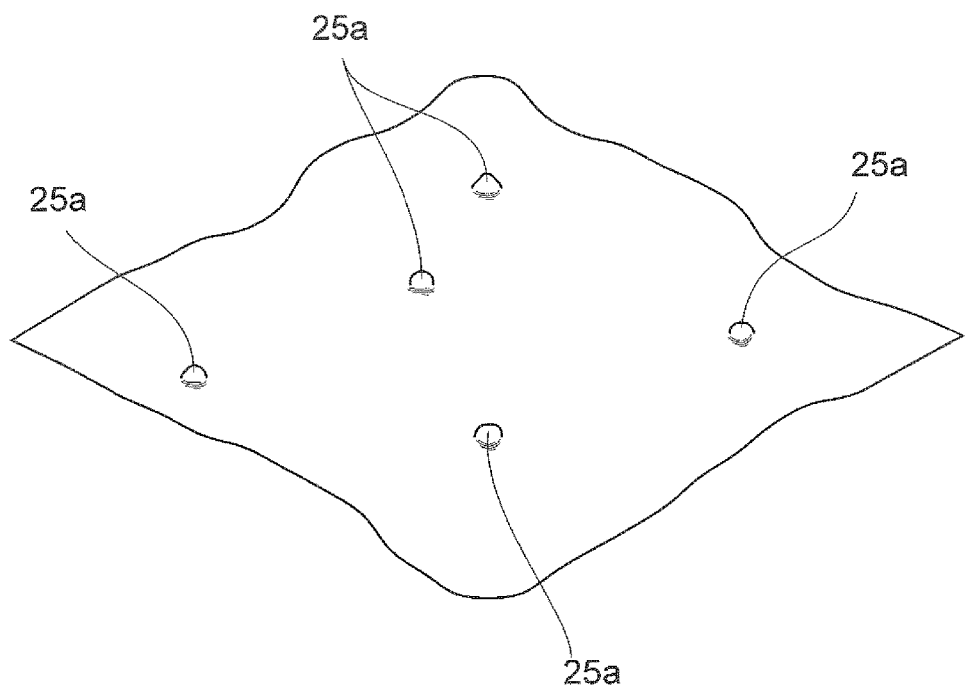
FIG. 9 is a perspective view showing a third electrode layer.

A plurality of projections 25a may be formed on the surface of the third electrode layer 25 being the Cu-plated layer, as also shown in FIGS. 8 and 9. In this case, each projection 25a is made of Cu. A diameter of each projection 25a is from 10 to 30 μm and a height of each projection 25a from 1 to 10 μm.

Next, the thicknesses of the respective electrode portions 5a, 5b, 5c, 7a, 7b, 7c of the first and second terminal electrodes 5, 7 will be described with reference to FIGS. 10 and 11.

Figure 10:
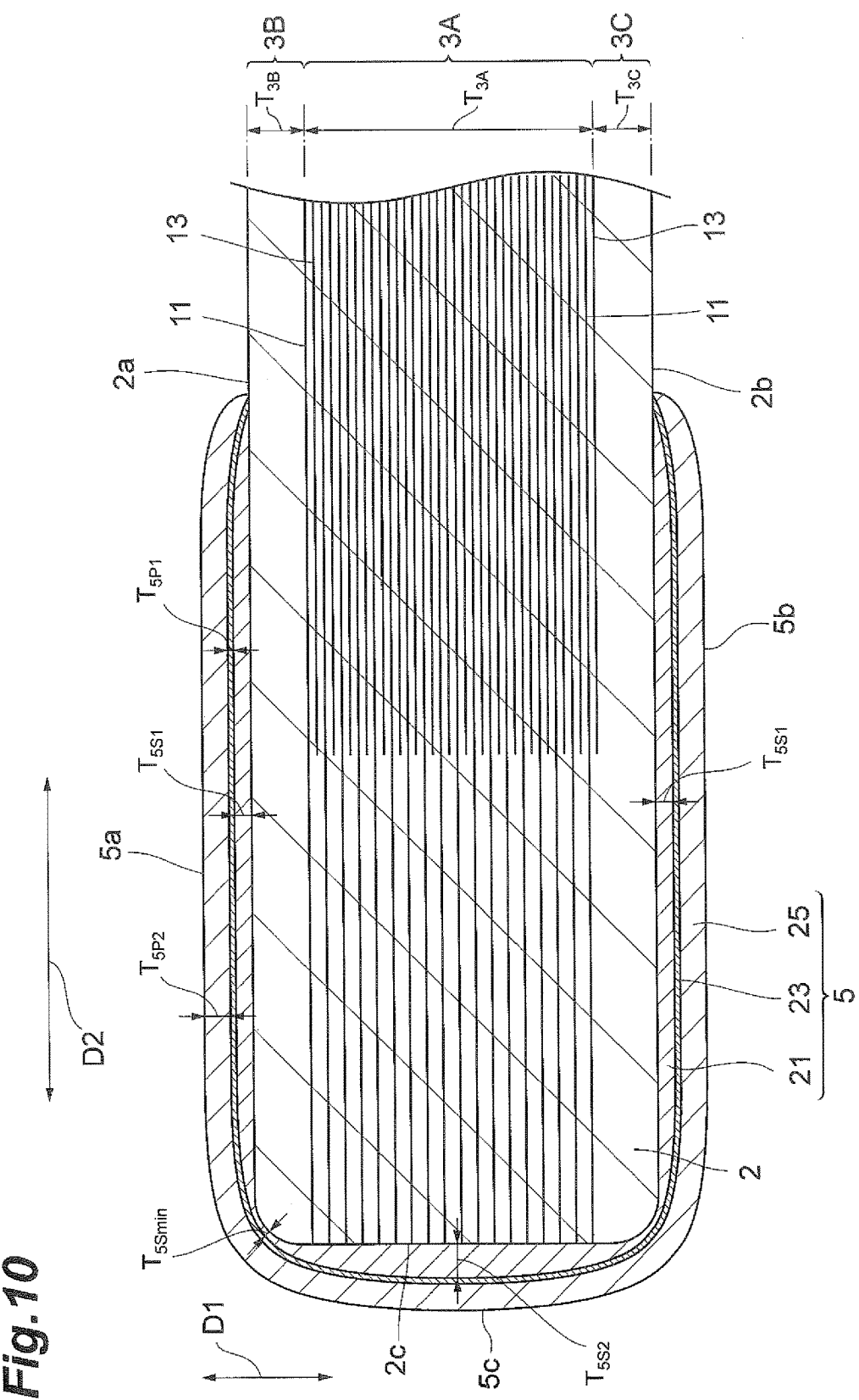
FIG. 10 is a drawing for explaining a cross-sectional configuration of a first terminal electrode.

As shown in FIG. 10, the thicknesses of the first electrode layer 21 of each of the electrode portions 5a, 5b are determined in such a manner that the maximum thickness is the thickness of a central portion as viewed from the first direction D1 and that the minimum thickness is the thickness of a portion located at the ridgeline between the principal surface 2a or 2b and the first side surface 2c. The thicknesses of the first electrode layer 21 of the electrode portion 5c are determined in such a manner that the maximum thickness is the thickness of a central portion as viewed from the second direction D2 and that the minimum thickness is the thickness of each of portions located at the ridgelines between the principal surfaces 2a, 2b and the first side surface 2c. The electrode portions 5a, 5b and the electrode portion 5c are connected at the ridgelines between the principal surfaces 2a, 2b and the first side surface 2c. For this reason, the thicknesses of the portions located at the ridgelines in the first electrode layers 21 of the electrode portions 5a, 5b are equivalent to the thicknesses of the portions located at the ridgelines in the first electrode layer 21 of the electrode portion 5c.

The first electrode layer 21 of each electrode portion 5a or 5b has the maximum thickness $T_{5S1}$ and the minimum thickness $T_{5Smin}$. The first electrode layer 21 of the electrode portion 5c has the maximum thickness $T_{5S2}$ and the minimum thickness $T_{5Smin}$. The second electrode layer 23 has the thickness $T_{5P1}$ equivalent throughout all of the electrode portions 5a, 5b, 5c. The third electrode layer 25 also has the thickness $T_{5P2}$ equivalent throughout all of the electrode portions 5a, 5b, 5c.

The thickness of each electrode portion 5a, 5b, or 5c is defined by a total value of the respective thicknesses of the first electrode layer 21, the second electrode layer 23, and the third electrode layer 25 constituting the corresponding electrode portion 5a, 5b, or 5c. Therefore, each electrode portion 5a or 5b has the maximum thickness $(T_{5S1}+T_{5P1}+T_{5P2})$ in the central portion as viewed from the first direction D1. Each electrode portion 5a or 5b has the minimum thickness $(T_{5Smin}+T_{5P1}+T_{5P2})$ in the portion located at the ridgeline between the principal surface 2a or 2b and the first side surface 2c. The electrode portion 5c has the maximum thickness $(T_{5S2}+T_{5P1}+T_{5P2})$ in the central portion as viewed from the second direction D2. The electrode portion 5c has the minimum thickness $(T_{5Smin}+T_{5P1}+T_{5P2})$ in the portions located at the ridgelines between the principal surfaces 2a, 2b and the first side surface 2c.

Figure 11:
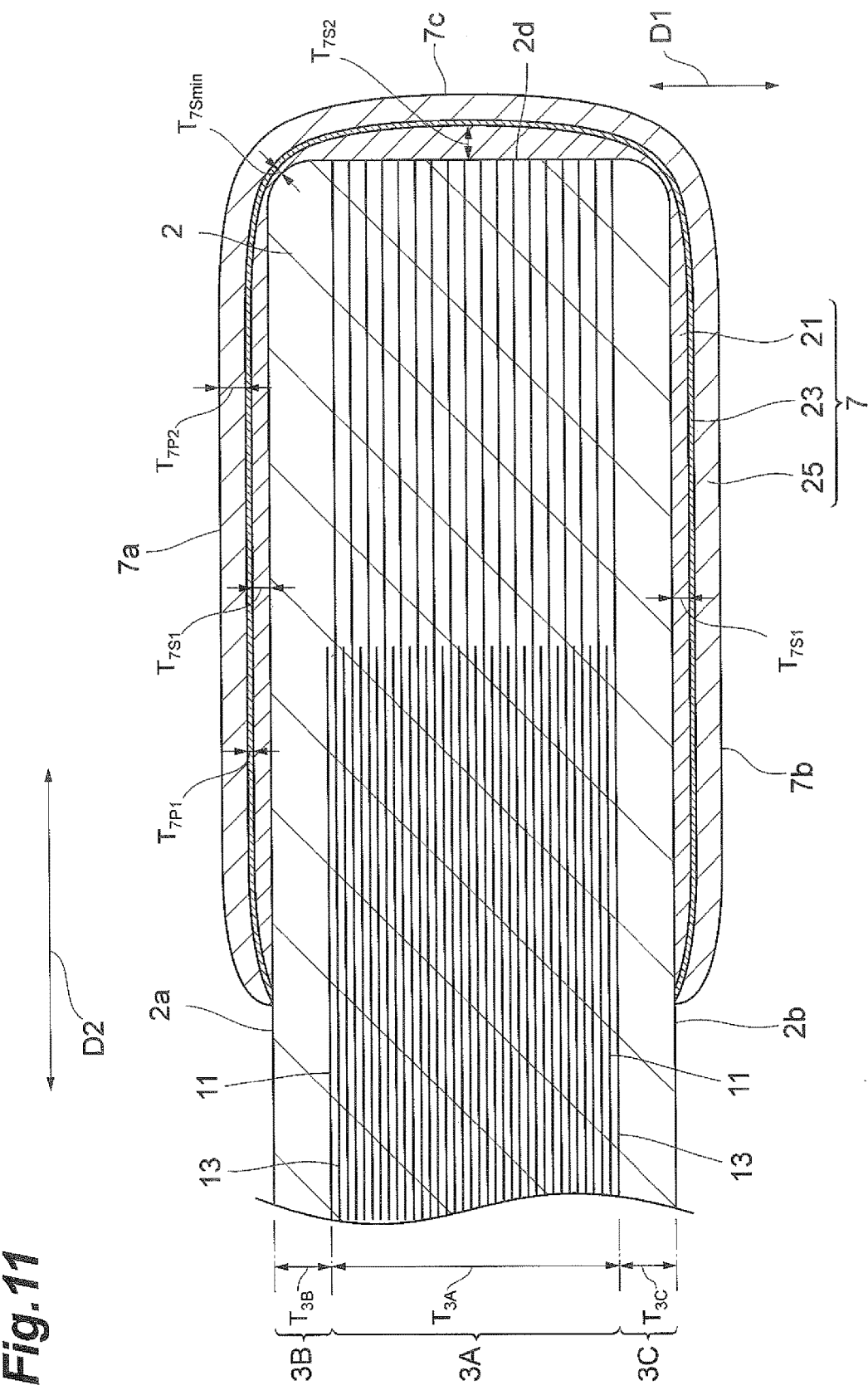
FIG. 11 is a drawing for explaining a cross-sectional configuration of a second terminal electrode.

As shown in FIG. 11, the thicknesses of the first electrode layer 21 of each of the electrode portions 7a, 7b are determined in such a manner that the maximum thickness is the thickness of a central portion as viewed from the first direction D1 and that the minimum thickness is the thickness of a portion located at the ridgeline between the principal surface 2a or 2b and the first side surface 2d. The thicknesses of the first electrode layer 21 of the electrode portion 7c are determined in such a manner that the maximum thickness is the thickness of a central portion as viewed from the second direction D2 and that the minimum thickness is the thickness of each of portions located at the ridgelines between the principal surfaces 2a, 2b and the first side surface 2d. The electrode portions 7a, 7b and the electrode portion 7c are connected at the ridgelines between the principal surfaces 2a, 2b and the first side surface 2d. For this reason, the thicknesses of the portions located at the ridgelines in the first electrode layers 21 of the electrode portions 7a, 7b are equivalent to the thicknesses of the portions located at the ridgelines in the first electrode layer 21 of the electrode portion 7c.

The first electrode layer 21 of each electrode portion 7a or 7b has the maximum thickness $T_{7S1}$ and the minimum thickness $T_{7Smin}$. The first electrode layer 21 of the electrode portion 7c has the maximum thickness $T_{7S2}$ and the minimum thickness $T_{7Smin}$. The second electrode layer 23 has the thickness $T_{7P1}$ equivalent throughout all of the electrode portions 7a, 7b, 7c. The third electrode layer 25 also has the thickness $T_{7P2}$ equivalent throughout all of the electrode portions 7a, 7b, 7c.

The thickness of each electrode portion 7a, 7b, or 7c is defined by a total value of the respective thicknesses of the first electrode layer 21, the second electrode layer 23, and the third electrode layer 25 constituting the corresponding electrode portion 7a, 7b, or 7c. Therefore, each electrode portion 7a or 7b has the maximum thickness ($T_{7S1}+T_{7P1}+T_{7P2}$) in the central portion as viewed from the first direction D1. Each electrode portion 7a or 7b has the minimum thickness ($T_{7Smin}+T_{7P1}+T_{7P2}$) in the portion located at the ridgeline between the principal surface 2a or 2b and the first side surface 2d. The electrode portion 7c has the maximum thickness ($T_{7S2}+T_{7P1}+T_{7P2}$) in the central portion as viewed from the second direction D2. The electrode portion 7c has the minimum thickness ($T_{7Smin}+T_{7P1}+T_{7P2}$) in the portions located at the ridgelines between the principal surfaces 2a, 2b and the first side surface 2d.

A difference between the maximum thickness $T_{5S1}$ and the minimum thickness $T_{5Smin}$ of the first electrode layer 21 of each of the electrode portions 5a, 5b is smaller than a difference between the maximum thickness $T_{5S2}$ and the minimum thickness $T_{5Smin}$ of the first electrode layer 21 of the electrode portion 5c. A difference between the maximum thickness ($T_{5S1}+T_{5P1}+T_{5P2}$) and the minimum thickness ($T_{5Smin}+T_{5P1}+T_{5P2}$) of each electrode portion 5a or 5b is smaller than a difference between the maximum thickness ($T_{5S2}+T_{5P1}+T_{5P2}$) and the minimum thickness ($T_{5Smim}+T_{5P1}+T_{5P2}$) of the electrode portion 5c.

A difference between the maximum thickness $T_{7S1}$ and the minimum thickness $T_{7Smin}$ of the first electrode layer 21 of each of the electrode portions 7a, 7b is smaller than a difference between the maximum thickness $T_{7S2}$ and the minimum thickness $T_{7Smin}$ of the first electrode layer 21 of the electrode portion 7c. A difference between the maximum thickness ($T_{7S1}+T_{7P1}+T_{7P2}$) and the minimum thickness ($T_{7Smin}+T_{7P1}+T_{7P2}$) of each electrode portion 7a or 7b is smaller than a difference between the maximum thickness ($T_{7S2}+T_{7P1}+T_{7P2}$) and the minimum thickness ($T_{7Smin}+T_{7P1}+T_{7P2}$) of the electrode portion 7c.

In each of the electrode portions 5a, 5b, the maximum thickness $T_{5S1}$ of the first electrode layer 21 is larger than the thickness $T_{5P1}$ of the second electrode layer 23 and not more than the thickness $T_{5P2}$ of the third electrode layer 25. In each of the electrode portions 7a, 7b, the maximum thickness $T_{7S1}$ of the first electrode layer 21 is larger than the thickness $T_{7P1}$ of the second electrode layer 23 and not more than the thickness $T_{7P2}$ of the third electrode layer 25.

In the present embodiment, the maximum thickness $T_{5S1}$ and the maximum thickness $T_{7S1}$ are equivalent. Each of the maximum thicknesses $T_{5S1}$, $T_{7S1}$ is, for example, 8 μm. The maximum thickness $T_{5S2}$ and the maximum thickness $T_{7S2}$ are equivalent. Each of the maximum thicknesses $T_{5S2}$, $T_{7S2}$ is, for example, 12 μm. The minimum thickness $T_{5Smin}$ and the minimum thickness $T_{7Smin}$ are equivalent. Each of the minimum thickness $T_{5Smin}$ and the minimum thickness $T_{7Smin}$ is, for example, 1 μm. The thickness $T_{5P1}$ and the thickness $T_{7P1}$ are equivalent. Each of the thicknesses $T_{5P1}$, $T_{7P1}$ is, for example, 3 μm. The thickness $T_{5P2}$ and the thickness $T_{7P2}$ are equivalent. Each of the thicknesses $T_{5P2}$, $T_{7P2}$ is, for example, 10 μm.

The maximum thickness ($T_{5S1}+T_{5P1}+T_{5P2}$) of each electrode portion 5a or 5b and the maximum thickness ($T_{7S1}+T_{7P1}+T_{7P2}$) of each electrode portion 7a or 7b are larger than the thicknesses $T_{3B}$, $T_{3C}$ of the respective outer layer portions 3B, 3C. Each of the thicknesses $T_{3B}$, $T_{3C}$ is, for example, 15 μm.

In the present embodiment, as described above, the length in the first direction D1 of the element body 2 is smaller than the length in the second direction D2 of the element body 2 and smaller than the length in the third direction D3 of the element body 2. For this reason, the multilayer capacitor C1 is obtained that has reduced height and the multilayer capacitor is realized that is suitable for built-in mounting in a substrate. The first terminal electrode 5 includes the electrode portions 5a, 5b disposed on the principal surfaces 2a, 2b and the second terminal electrode 7 includes s the electrode portions 7a, 7b disposed on the principal surfaces 2a, 2b. The multilayer capacitor C1 can be electrically connected to wiring formed on the substrate, on the principal surface 2a side of the element body 2, on the principal surface 2b side of the element body 2, or, on both of the principal surface 2a, 2b sides of the element body 2. Therefore, the multilayer capacitor C1 can be readily built into the substrate.

In the electrode portions 5a, 5b, 7a, 7b, the maximum thicknesses $T_{5S1}$, $T_{7S1}$ of the first electrode layers 21 are larger than the thicknesses $T_{5P1}$, $T_{7P1}$ of the second electrode layers 23. For this reason, the second electrode layers 23 are thin and it is thus feasible to reduce stress occurring in a process of forming the second electrode layers 23 on the first electrode layers 21 in the multilayer capacitor C1, compared to a multilayer capacitor in which the thicknesses $T_{5P1}$, $T_{7P1}$ of the second electrode layers 23 are not less than the maximum thicknesses $T_{5S1}$, $T_{7S1}$ of the first electrode layers 21.

After the multilayer capacitor C1 is built into the substrate, via holes are formed in the substrate to reach the first and second terminal electrodes 5, 7 (electrode portions 5a, 5b, 7a, 7b). The via holes are formed by laser processing. In this case, the electrode portions 5a, 5b, 7a, 7b are irradiated with a laser beam, and may be damaged by the laser beam.

In the electrode portions 5a, 5b, 7a, 7b, the maximum thicknesses $T_{5S1}$, $T_{7S1}$ of the first electrode layers 21 are not more than the thicknesses $T_{5P2}$, $T_{7P2}$ of the third electrode layers 25. For this reason, the third electrode layers 25 are thick and it is thus feasible to suppress the effect of damage due to the irradiation with the laser beam in the multilayer capacitor C1, compared to a multilayer capacitor in which the thicknesses $T_{5P2}$, $T_{7P2}$ of the third electrode layers 25 are smaller than the maximum thicknesses $T_{5S1}$, $T_{7S1}$ of the first electrode layers 21.

Each first electrode layer 21 is a sintered conductor layer containing Cu. The first internal electrodes 11 and the first terminal electrode 5 (first electrode layer 21) are securely kept in contact with each other due to the first internal electrodes 11 being connected to the first electrode layer 21 of t the first terminal electrode 5. The second internal electrodes 13 and the second terminal electrode 7 (first electrode layer 21) are securely kept in contact with each other due to the second internal electrodes 13 being connected to the first electrode layer 21 of the second terminal electrode 7. The first electrode layer 21 may be a sintered conductor layer containing Ni.

Each second electrode layer 23 is an Ni-plated layer. For this reason, the second electrode layer 23 restrains the first electrode layer 21 from being damaged in a process of forming the third electrode layer 25. Therefore, it is feasible to suppress degradation of insulation resistance of the multilayer capacitor C1. The second electrode layer 23 may be an Sn-plated layer.

Each third electrode layer 25 is a Cu-plated layer. For this reason, it is feasible to ensure connectivity between the wiring formed on the substrate and the first and second terminal electrodes 5, 7. The third electrode layer 25 may be an Au-plated layer.

Since the difference between the maximum thickness $(T_{5S1}+T_{5P1}+T_{5P2})$ and the minimum thickness $(T_{5Smin}+T_{5P1}+T_{5P2})$ of each electrode portion 5a or 5b is smaller than the difference between the maximum thickness $(T_{5S2}+T_{5P1}+T_{5P2})$ and the minimum thickness $(T_{5Smin}+T_{5P1}+T_{5P2})$ of the electrode portion 5c, the electrode portions 5a, 5b have a higher degree of flatness than the electrode portion 5c does. This improves connection reliability between the wiring formed on the substrate and the first terminal electrode 5. Since the difference between the maximum thickness $(T_{7S1}+T_{7P1}+T_{72})$ and the minimum thickness $(T_{7Smin}+T_{7P1}+T_{7P2})$ of each electrode portion 7a or 7b is smaller than the difference between the maximum thickness $(T_{7S2}+T_{7P1}+T_{7P2})$ and the minimum thickness $(T_{7Smin}+T_{7P1}+T_{7P2})$ of the electrode portion 7c, the electrode portions 7a, 7b have a higher degree of flatness than the electrode portion 7c does. This improves connection reliability between the wiring formed on the substrate and the second terminal electrode 7.

The via holes by laser processing are formed in tapered shape with their diameter decreasing from the surface side of the substrate to the first or second terminal electrode 5, 7 (electrode portion 5a, 5b, 7a, 7b) side. The farther the distance from the surface of the substrate, the smaller the inside diameter of each via hole. Namely, the farther the distance from the surface of the substrate, the smaller the area of the via conductor formed in each via hole. As the areas of the via conductors become smaller, connection areas between the first and second terminal electrodes 5, 7 and the via conductors also become smaller.

When the electrode portions 5a, 5b have the higher degree of flatness than the electrode portion 5c does, the distances from the surface of the substrate to the electrode portions 5a, 5b of the first terminal electrode 5 are approximately constant. Therefore, when a plurality of via conductors are connected to the first terminal electrode 5, the connection areas between each of the via conductors and the first terminal electrode 5 are equivalent. When the electrode portions 7a, 7b have the higher degree of flatness than the electrode portion 7c does, the distances from the surface of the substrate to the electrode portions 7a, 7b of the second terminal electrode 7 are approximately constant. Therefore, when a plurality of via conductors are connected to the second terminal electrode 7, the connection areas between each of the via conductors and the second terminal electrode 7 are equivalent. These configurations improve the connection reliability between the via conductors and the first and second terminal electrodes 5, 7.

The thicknesses $T_{3B}$, $T_{3C}$ of the respective outer layer portions 3B, 3C are smaller than the maximum thickness $(T_{5S1}+T_{5P1}+T_{5P2})$ of each electrode portion 5a or 5b and smaller than the maximum thickness $(T_{7S1}+T_{7P1}+T_{7P2})$ of each electrode portion 7a or 7b. For this reason, in the multilayer capacitor C1, it is feasible to achieve further reduction in height, compared to a multilayer capacitor in which the thicknesses $T_{3B}$, $T_{3C}$ are not less than the maximum thicknesses $(T_{5S1}+T_{5P1}+T_{5P2}, T_{7S1}+T_{7P1}+T_{7P2})$ of the electrode portions 5a, 5b, 7a, 7b.

The maximum thicknesses $(T_{5S1}+T_{5P1}+T_{5P2}, T_{7S1}+T_{7P1}+T_{7P2})$ of the electrode portions 5a, 5b, 7a, 7b are larger than the thicknesses $T_{3B}$, $T_{3C}$. For this reason, each of the electrode portions 5a, 5b, 7a, 7b is thick in the multilayer capacitor C1, compared to a multilayer capacitor in which the maximum thicknesses $(T_{5S1}+T_{5P1}+T_{5P2}, T_{7S1}+T_{7P1}+T_{7P2})$ of the electrode portions 5a, 5b, 7a, 7b are not more than the thicknesses $T_{3B}$, $T_{3C}$. Therefore, it is feasible to suppress the effect of damage due to the irradiation with the laser beam even in the case where the electrode portions 5a, 5b, 7a, 7b are irradiated with the laser beam.

The length in the first direction D1 of the element body 2 is smaller than the lengths $L_{51}$, $L_{71}$. For this reason, it is feasible to achieve further reduction in height of the multilayer capacitor C1. In the multilayer capacitor C1, the areas of the electrode portions 5a, 5b, 7a, 7b are large and the electrode areas to be connected to the wiring formed on the substrate are large, compared to a multilayer capacitor in which the lengths $L_{51}$, $L_{71}$ are smaller than the length in the first direction D1 of the element body 2. For this reason, it is easy to implement connection between the wiring formed on the substrate and the first and second terminal electrodes 5, 7.

The length in the first direction D1 of the element body 2 is smaller than the gap $G_1$. This configuration also achieves further reduction in height of the multilayer capacitor C1.

The gap $G_1$ is not more than the lengths $L_{51}$, $L_{71}$. In this case, in the multilayer capacitor C1, the areas of the electrode portions 5a, 5b, 7a, 7b are large and the electrode areas to be connected to the wiring formed on the substrate are large, compared to a multilayer capacitor in which the gap $G_1$ is larger than the lengths $L_{51}$, $L_{71}$. For this reason, it is easy to implement connection between the wiring formed on the substrate and the first and second terminal electrodes 5, 7.

The multilayer capacitor C1, as described below, is placed in a housing portion of a substrate and thereafter the housing portion is filled with a resin, whereby the multilayer capacitor C1 is built into the substrate. When the projections 25a are formed on the surface of the third electrode layers 25 of the Cu-plated layers, the projections 25a form unevenness on the surface of the third electrode layers 25. In the configuration wherein the projections 25a are formed on the third electrode layers 25, the surface areas of the third electrode layers 25 are large and better engagement is achieved between the third electrode layers 25 and the resin due to the unevenness, compared to a configuration without the projections 25a. Therefore, adhesion between the third electrode layers 25 and resin can be improved when the multilayer capacitor C1 is built into the substrate.

Figure 12:
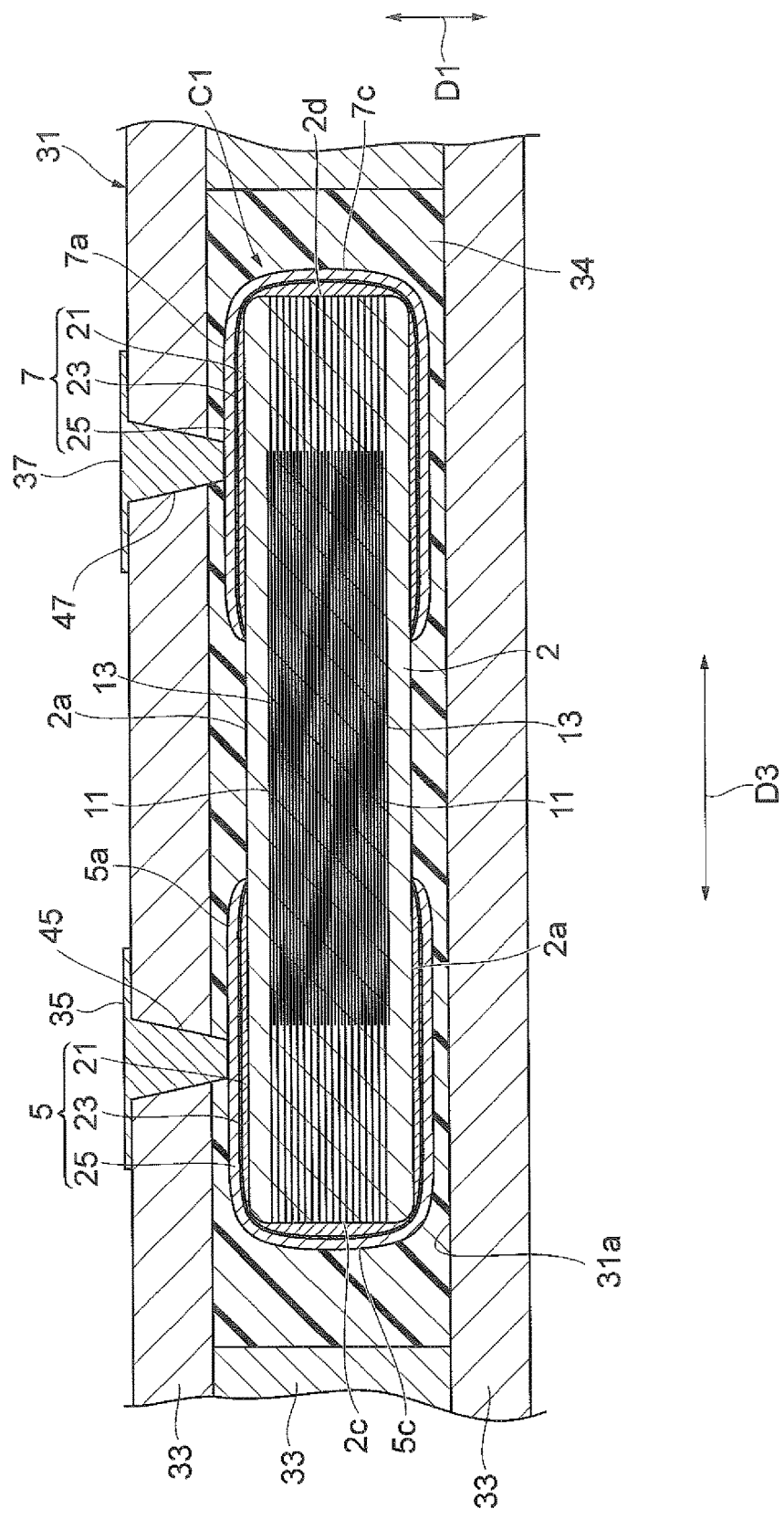
FIG. 12 is a drawing for explaining a mounted structure of the multilayer capacitor according to the embodiment.

The multilayer capacitor C1, as shown in FIG. 12, is mounted as embedded in a substrate 31. The multilayer capacitor C1 is built into the substrate 31. FIG. 12 is a drawing for explaining a mounted structure of the multilayer capacitor according to the present embodiment.

The substrate 31 is constructed by stacking a plurality of insulating layers 33. The insulating layers 33 are made of an insulating material such as ceramic or resin, and are integrated with each other by adhesion or the like.

The multilayer capacitor C1 is disposed in a housing portion 31a formed in the substrate 31. The multilayer capacitor C1 is fixed to the substrate 31 by resin 34 filled in the housing portion 31a. The multilayer capacitor C1 is embedded in the substrate 31. The multilayer capacitor C1 is electrically connected through via conductors 45, 47 to electrodes 35, 37 disposed on the surface of the substrate 31. The first terminal electrode 5 (electrode portion 5a) is electrically connected through the via conductor 45 to the electrode 35. The second terminal electrode 7 (electrode portion 7a) is electrically connected through the via conductor 47 to the electrode 37.

The via conductors 45, 47 are formed by growing an electroconductive metal (e.g., Cu or Au or the like) in via holes formed in the substrate 31. The growth of the electroconductive metal is realized, for example, by electroless plating. The via holes are formed to reach the electrode portions 5a, 7a of the first and second terminal electrodes 5, 7 of the multilayer capacitor C1 from the surface side of the substrate 31. The via holes are formed, for example, by laser processing.

The first and second terminal electrodes 5, 7 include their respective sufficient connection areas with the via conductors 45, 47 in the flat regions of the electrode portions 5a, 7a, For this reason, the first and second terminal electrodes 5, 7 (electrode portions 5a, 7a) can be certainly connected to the via conductors 45, 47.

In the multilayer capacitor C1, the electrode portions 5a, 7a include the third electrode layers 25 as plated layers. Therefore, the electrode portions 5a, 7a can be securely connected to the via conductors 45, 47 formed in the via holes. When the via conductors 45, 47 are formed by plating, the via conductors 45, 47 are more securely connected to the electrode portions 5a, 7a.

Figure 13:
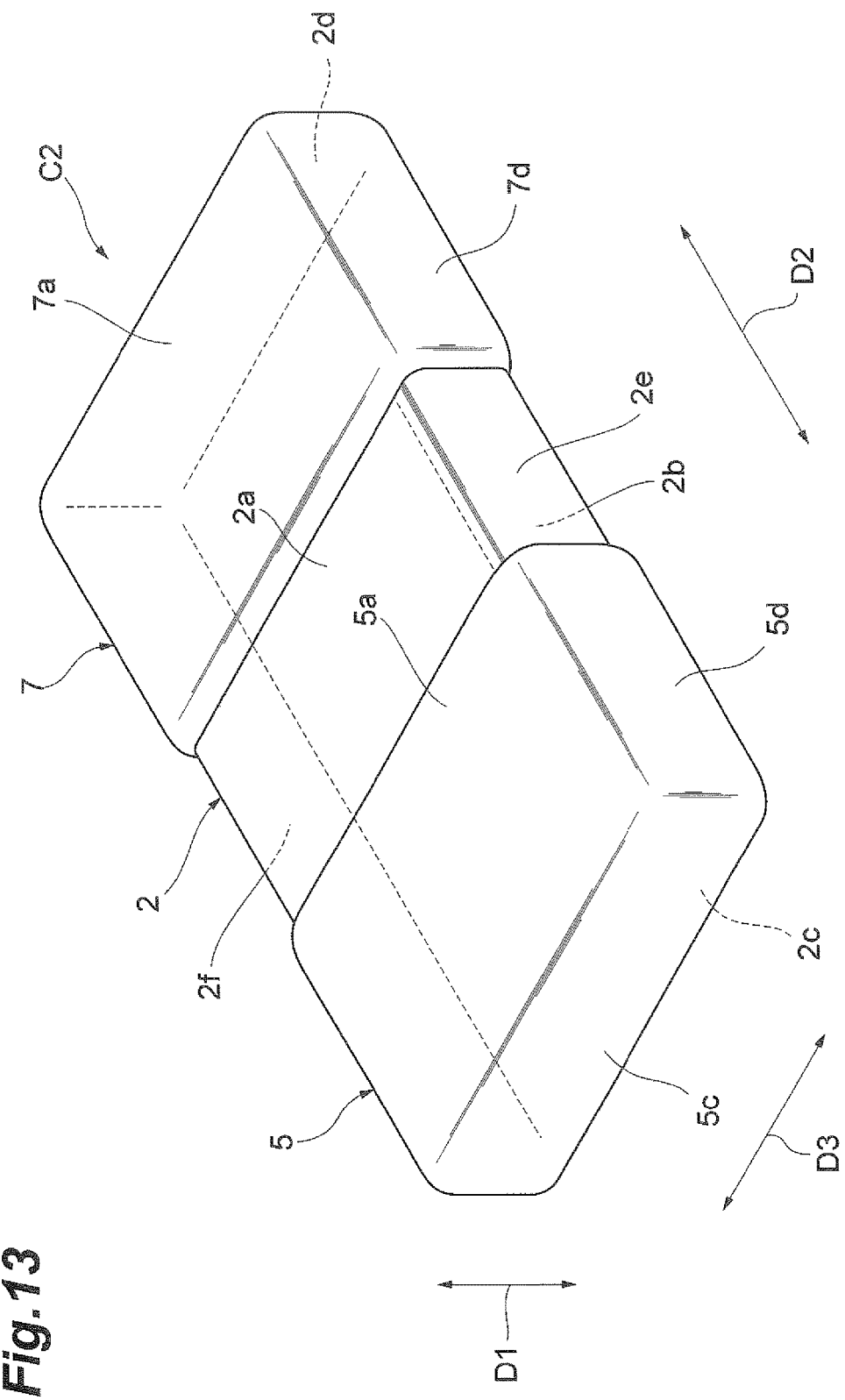
FIG. 13 is a perspective view showing a multilayer capacitor according to a modification example of the embodiment.
Figure 14:
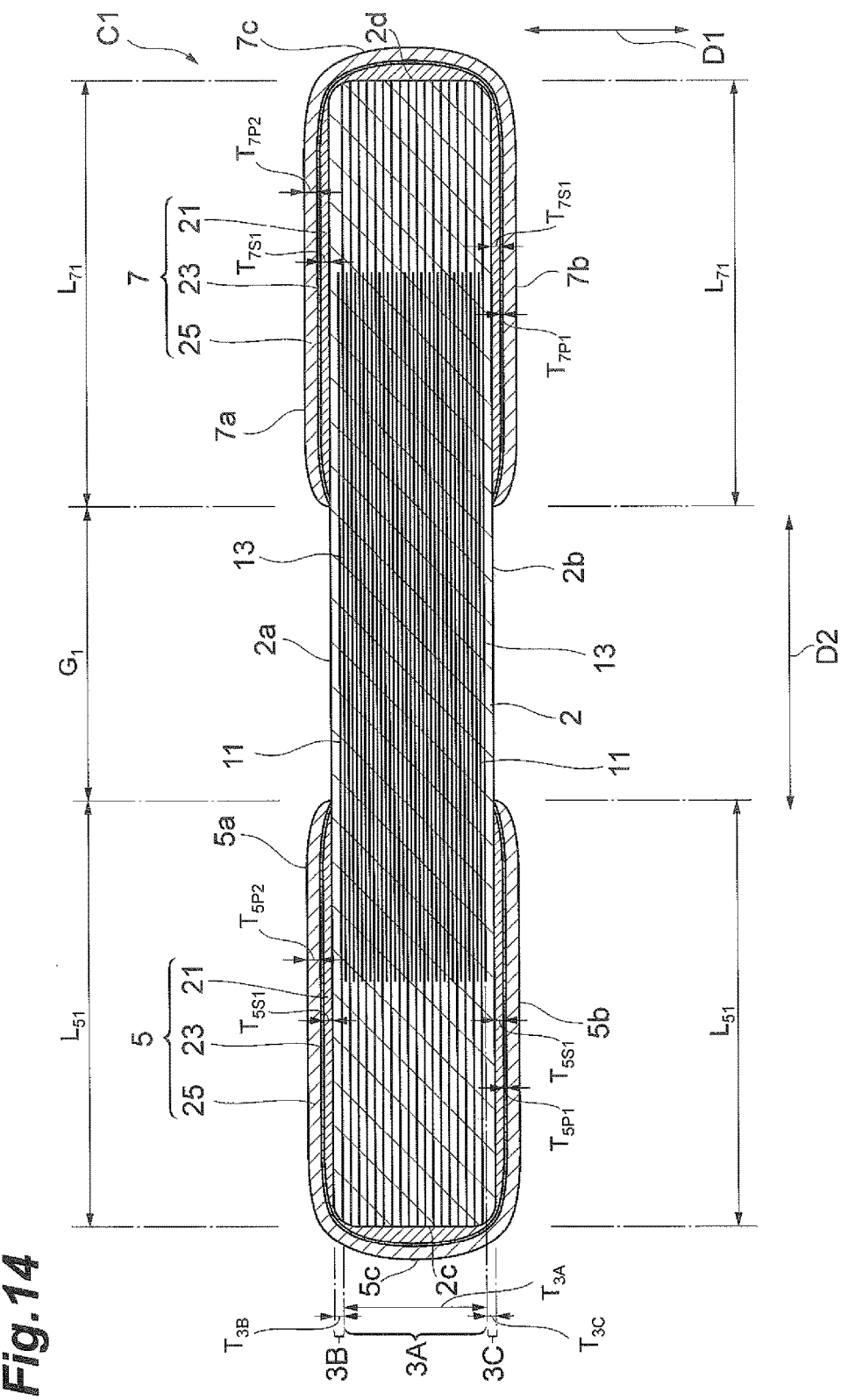
FIG. 14 is a drawing for explaining a cross-sectional configuration of the multilayer capacitor according to the modification example of the embodiment.
Figure 15:
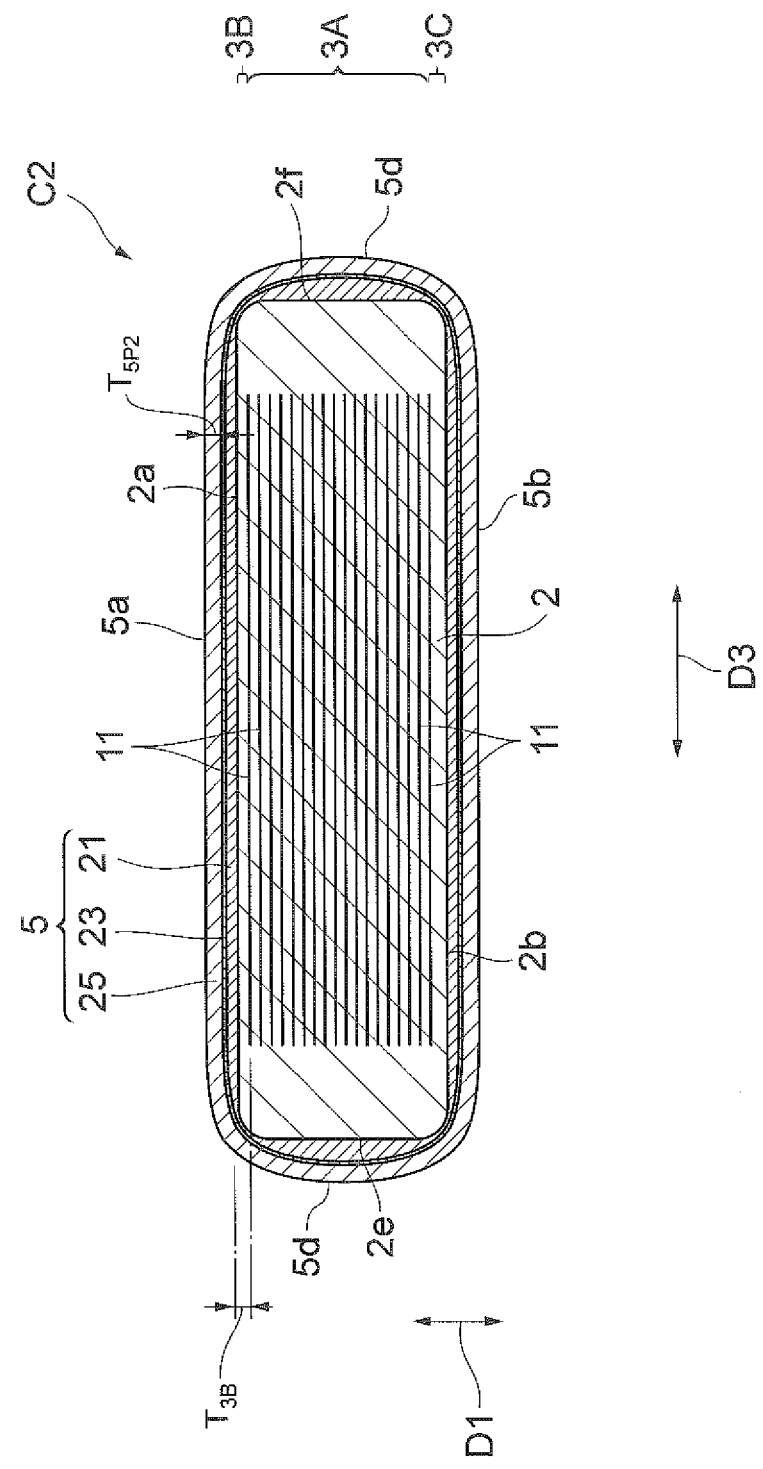
FIG. 15 is a drawing for explaining a cross-sectional configuration of the multilayer capacitor according to the modification example of the embodiment.
Figure 16:
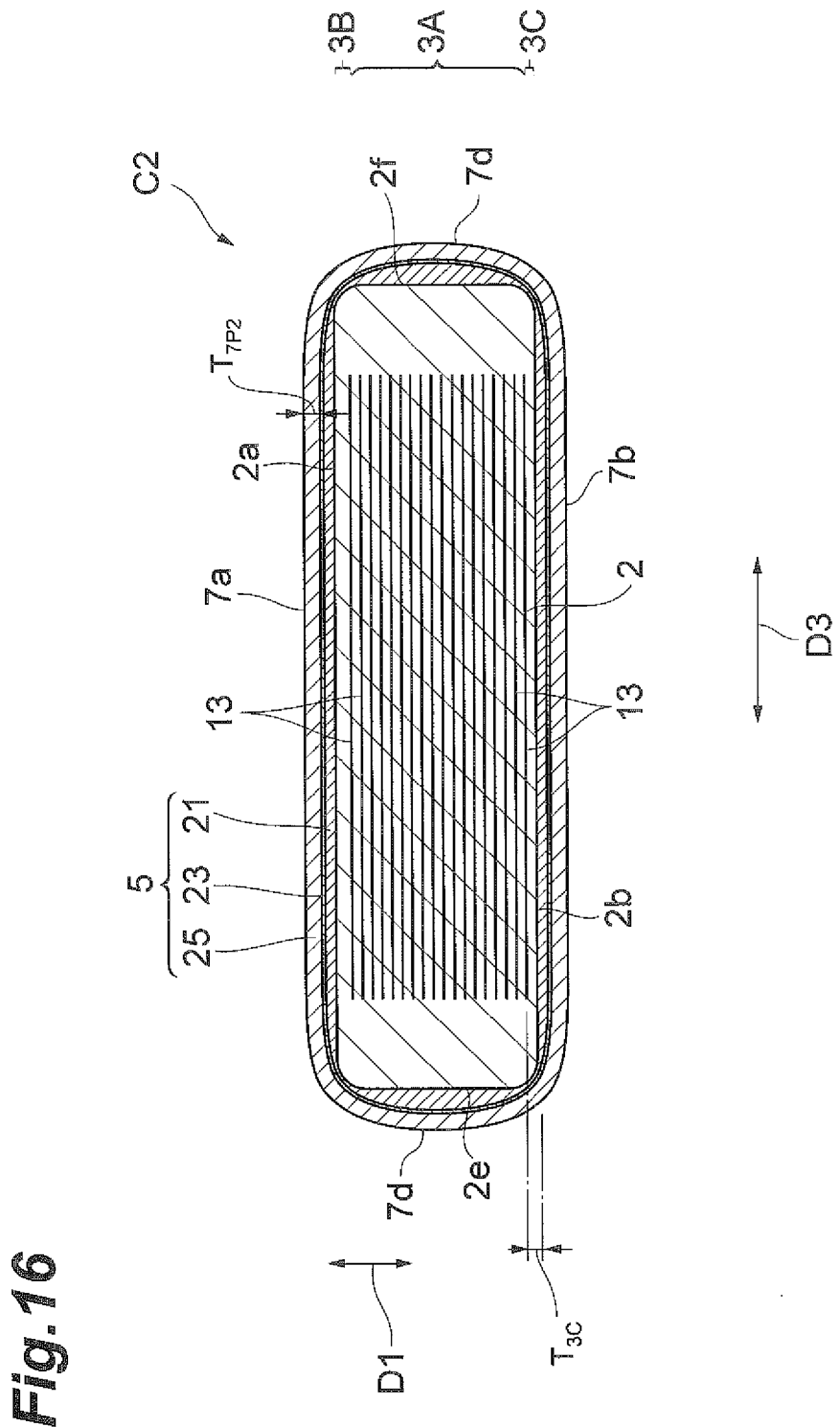
FIG. 16 is a drawing for explaining a cross-sectional configuration of the multilayer capacitor according to the modification example of the embodiment.

Next, a configuration of a multilayer capacitor C2 according to a modification example of the foregoing embodiment will be described with reference to FIGS. 13 to 16. FIG. 13 is a perspective view showing the multilayer capacitor according to the present modification example. FIGS. 14 to 16 are drawings for explaining cross-sectional configurations of the multilayer capacitor according to the present modification example.

The multilayer capacitor C2 includes the element body 2, the first terminal electrode 5 and second terminal electrode 7, the plurality of first internal electrodes 11, and the plurality of second internal electrodes 13.

The length in the first direction D1 of the element body 2, i.e., the length in the height direction of the element body 2 is smaller in the multilayer capacitor C2 than that in the multilayer capacitor C1. In the present modification example, the thicknesses $T_{3B}$, $T_{3C}$ of the respective outer layer portions 3B, 3C are smaller than the thicknesses $T_{5P2}$, $T_{7P2}$ of the third electrode layers 25. For this reason, the present modification example can achieve further reduction in height of the multilayer capacitor C2.

In the multilayer capacitor C2, just as in the multilayer capacitor C1, the maximum thicknesses $T_{5S1}$, $T_{7S1}$ of the first electrode layers 21 are also larger than the thicknesses $T_{5P1}$, $T_{7P1}$ of the second electrode layers 23 in the electrode portions 5a, 5b, 7a, 7b. For this reason, it is feasible to reduce the stress occurring in the process of forming the second electrode layers 23 on the first electrode layers 21. In the multilayer capacitor C2, the maximum thicknesses $T_{5S1}$, $T_{7S1}$ of the first electrode layers 21 are also not more than the thicknesses $T_{5P2}$, $T_{7P2}$ of the third electrode layers 25 in the electrode portions 5a, 5b, 7a, 7b. For this reason, the thicknesses $T_{5P2}$, $T_{7P2}$ of the third electrode layers 25 are larger than the maximum thicknesses $T_{5S1}$, $T_{7S1}$ of the first electrode layers 21 and it is thus feasible to suppress the effect of damage due to the irradiation with the laser beam.

The embodiment of the present invention has been described above, but it should be noted that the present invention is not always limited only to the above-described embodiment but can be modified in many ways without departing from the spirit and scope of the invention.

The first terminal electrode 5 does not always have to include the electrode portion 5a and the electrode portion 5b. It is sufficient that the first terminal electrode 5 includes at least either of the electrode portion 5a and the electrode portion 5b as an electrode portion to be connected to the wiring formed on the substrate. The second terminal electrode 7 does not always have to include the electrode portion 7a and the electrode portion 7b. It is sufficient that the second terminal electrode 7 includes at least either of the electrode portion 7a and the electrode portion 7b as an electrode portion to be connected to the wiring formed on the substrate.

The first terminal electrode 5 does not have to include the electrode portions 5d. The first terminal electrode 5 may be formed on the three surfaces 2a, 2b, and 2c. The second terminal electrode 7 does not have to include the electrode portions 7d. The first terminal electrode 7 may be formed on the three surfaces 2a, 2b, and 2d.

FIG. 12 shows the configuration wherein the multilayer capacitor C1 is embedded in the substrate 31, but the multilayer capacitor C2 may be mounted as embedded in the substrate 31.

What is claimed is:

1. A multilayer capacitor comprising:
an element body of a rectangular parallelepiped shape, the element body including a pair of principal surfaces opposing each other in a first direction, a pair of first side surfaces opposing each other in a second direction perpendicular to the first direction, and a pair of second side surfaces opposing each other in a third direction perpendicular to the first and second directions;
a plurality of first internal electrodes and second internal electrodes alternately disposed in the element body to oppose each other in the first direction;
a first terminal electrode including a first electrode portion disposed on one of the pair of principal surfaces and a second electrode portion disposed on one of the first side surfaces, the second electrode portion being connected to the plurality of first internal electrodes; and
a second terminal electrode including a third electrode portion disposed on the one of the pair of principal surfaces and a fourth electrode portion disposed on an other of the first side surfaces, the third electrode portion being separated from the first electrode portion in the second direction on the one of the pair of principal surfaces, the fourth electrode portion being connected to the plurality of second internal electrodes,
wherein the element body includes an inner layer portion and a pair of outer layer portions, the inner layer portion being located between the pair of outer layer portions in the first direction, the plurality of first internal electrodes and the plurality of second internal electrodes being located in the inner layer portion,
wherein a length in the first direction of the element body is smaller than a length in the second direction of the element body and smaller than a length in the third direction of the element body,
wherein each of the first terminal electrode and the second terminal electrode includes a sintered conductor layer formed on the element body, a first plated layer formed on the sintered conductor layer, and a second plated layer formed on the first plated layer,
wherein in each of the first electrode portion and the third electrode portion, a maximum thickness of the sintered conductor layer is larger than a thickness of the first plated layer and not more than a thickness of the second plated layer, wherein a difference between a maximum thickness and a minimum thickness of the first electrode portion is smaller than a difference between a maximum thickness and a minimum thickness of the second electrode portion, and wherein a difference between a maximum thickness and a minimum thickness of the third electrode portion is smaller than a difference between a maximum thickness and a minimum thickness of the fourth electrode portion.

2. The multilayer capacitor according to claim 1, wherein the sintered conductor layer contains Cu or Ni.

3. The multilayer capacitor according to claim 1, wherein the first plated layer contains Ni or Sn.

4. The multilayer capacitor according to claim 1, wherein the second plated layer contains Cu or Au.

5. The multilayer capacitor according to claim 1, wherein thicknesses of the respective outer layer portions are smaller than a maximum thickness of the first electrode portion and smaller than a maximum thickness of the third electrode portion.

6. The multilayer capacitor according to claim 1, wherein the length in the first direction of the element body is smaller than a length in the second direction of the first electrode portion and smaller than a length in the second direction of the third electrode portion.

7. The multilayer capacitor according to claim 1, wherein the length in the first direction of the element body is smaller than a gap between the first electrode portion and the third electrode portion in the second direction.

8. The multilayer capacitor according to claim 1, wherein:
the length of the element body in the second direction is greater than the length of the element body in the third direction; and
a gap between the first electrode portion and the third electrode portion in the second direction is not more than a length in the second direction of the first electrode portion and not more than a length in the second direction of the third electrode portion.

9. The multilayer capacitor according to claim 1, wherein thicknesses of the respective outer layer portions are smaller than the thickness of the second plated layer.

10. The multilayer capacitor according to claim 1, wherein the second plated layer is a Cu-plated layer, and wherein projections being made of Cu are formed on a surface of the Cu-plated layer.

* * * * *